United States Patent [19]
Juang et al.

[11] Patent Number: 4,783,804
[45] Date of Patent: Nov. 8, 1988

[54] HIDDEN MARKOV MODEL SPEECH RECOGNITION ARRANGEMENT

[75] Inventors: Biing-Hwang Juang, Lincroft; Stephen E. Levinson, Westfield; Lawrence R. Rabiner, Berkeley Heights; Man M. Sondhi, both of Berkeley Heights, all of N.J.

[73] Assignee: American Telephone and Telegraph Company, AT&T Bell Laboratories, Murray Hill, N.J.

[21] Appl. No.: 714,517

[22] Filed: Mar. 21, 1985

[51] Int. Cl.$^4$ .............................................. G10L 5/00
[52] U.S. Cl. ...................................................... 381/43
[58] Field of Search ..................................... 381/41–43

[56] References Cited

U.S. PATENT DOCUMENTS

4,348,553  9/1982  Baker et al. ...................... 179/1 SB
4,654,875  3/1987  Srihari et al. .......................... 382/40

OTHER PUBLICATIONS

James K. Baker, "The Dragon System–An Overview", *IEEE Transactions on Acoustics, Speech and Signal Processing*, vol. ASSP-23, No. 1, Feb. 1975, pp. 24–29.

L. R. Rabiner et al., "On the Application of Vector Quantization and Hidden Markov Models to Speaker-Independent, Isolated Word Recognition", *The Bell System Technical Journal*, vol. 62, No. 4, Apr. 1983, pp. 1075–1105.

L. R. Rabiner and J. G. Wilpon, "Considerations in Applying Clustering Techniques to Speaker-Independent Word Recognition", *Journal of the Acoustical Society of America*, 66(3), Sep. 1979, pp. 663–673.

Leonard E. Baum, "An Inequality and Associated Maximization Technique in Statistical Estimation for Probabilistic Functions of Markov Processes", *Inequalities-III*, 1972, pp. 1–8.

B. Juang et al., "Distortion Performance of Vector Quantization for LPC Voice Coding", *IEEE Transactions on Acoustics, Speech and Signal Processing*, vol. ASSP-30, No. 2, Apr. 1982, pp. 294–303.

*Primary Examiner*—Emanuel S. Kemeny
*Attorney, Agent, or Firm*—Jack Saul Cubert; Wilford L. Wisner

[57] ABSTRACT

Markov model speech pattern templates are formed for speech analysis systems by analyzing identified speech patterns to generate frame sequences of acoustic feature signals representative thereof. The speech pattern template is produced by iteratively generating succeeding Markov model signal sets starting with an initial Markov model signal set. Each iteration includes forming a set of signals representative of the current iteration Markov model of the identified speech pattern responsive to said frame sequences of acoustic feature signals and one of the previous Markov model signal sets and comparing the current iteration Markov model signal set with said previous Markov model signal set to generate a signal corresponding to the similarity therebetween. The iterations are terminated when said similarity signal is equal to or smaller than a predetermined value and the last formed Markov model signal set is selected as a reference template for said identified speech pattern. The state transition model has increased accuracy by grouping the feature signals into related clusters corresponding to states of the previous state transitional model, whereby with further grouping of the feature signals the continuous probability density function acquires components representing a mixture of different continuous probability density functions.

8 Claims, 12 Drawing Sheets

FIG. 8

| Acoustic Feature Frame Sequence | Word Ident. | No. of Frames |
|---|---|---|
| $o_1^1 \ o_2^1 \text{------} o_{T11}^1$ | $W_1$ | $T_{11}$ |
| $o_1^2 \text{------} o_{T21}^2$ | $W_2$ | $T_{21}$ |
| $o_1^3 \text{------} o_{T31}^3$ | $W_3$ | $T_{31}$ |
| $o_1^1 \text{------} o_{T12}^1$ | $W_1$ | $T_{12}$ |
| $o_1^9 \text{------} o_{T91}^9$ | $W_9$ | $T_{91}$ |
| $o_1^3 \text{------} o_{T32}^3$ | $W_3$ | $T_{32}$ |

FIG. 10

| Frame | STATE | | | | |
|---|---|---|---|---|---|
| | 1 | 2 | 3 | 4 | 5 |
| 1 | $o_{11}$ | $o_{21}$ | $o_{31}$ | $o_{41}$ | $o_{51}$ |
| 2 | $o_{12}$ | $o_{22}$ | $o_{32}$ | $o_{42}$ | |
| 3 | $o_{13}$ | | $o_{33}$ | | |
| 4 | $o_{14}$ | | | | |
| CS | $o_{1,CS(1)}$ | $o_{2,CS(2)}$ | $o_{3,CS(3)}$ | $o_{4,CS(4)}$ | $o_{5,CS(5)}$ |
| Count | $P_1$ | $P_2$ | $P_3$ | $P_4$ | $P_5$ |

HIDDEN MARKOV MODEL SPEECH RECOGNITION ARRANGEMENT

Our invention relates to pattern recognition and, more particularly, to arrangements for analyzing patterns using Markov modeling.

BACKGROUND OF THE INVENTION

In communication, data processing and other information systems, it is desirable to provide speech recognition input and synthesized voice output for inquiries, commands, and exchange of information. Such speech interface facilities permit interaction with data processing equipment from remote locations without expensive terminal equipment and allows a user to communicate with computer type devices in a natural manner without manually operated keyboards. While the advantages of speech interface facilities are well known, providing the speech recognition accuracy required for commercial use has presented formidable technical problems. Accurate speech recognition is relatively difficult to achieve because of the complexity of speech patterns and variations thereof among speakers. Acceptable results have been obtained in specialized applications where the recognition is restricted to particular individuals using constrained vocabularies. The success of automatic speech recognition equipment, however, is very limited where there is no restriction on the number of speakers or where the vocabulary of speech patterns to be identified is large.

Speech recognition arrangements generally are adapted to convert an unknown speech pattern to a sequence of prescribed acoustic features which is then compared to stored sets of acoustic feature sequences representative of previously identified speech patterns. As a result of the comparison, the unknown speech pattern may be identified as the stored set having the most similar acoustic feature sequence on the basis of predetermined recognition criteria. Recognition accuracy of such systems is highly dependent on the acoustic features that are prescribed and the recognition criteria used.

The comparison between an unknown speech pattern and the stored reference sets may be direct or may be adjusted to take into account differences in speaking rate and differences in articulation. Some speech recognition systems employ dynamic programming to determine the optimum alignment between patterns. Such dynamic time warping mitigates the effects of variations in speech rate and articulation on recognition accuracy. The signal processing arrangements for dynamic time warp comparisons, however, are complex and the time needed for recognition of a speech pattern is a function of the size of the reference pattern vocabulary as well as the speed of operation of the recognition equipment. Where the recognition is speaker independent, the number of reference patterns is very large so that real time recognition of a pattern for vocabularies of the order of 50 words is difficult to achieve with acceptable accuracy.

Another approach to automatic speech recognition uses probabilistic modeling, e.g., Markov models, in which the sequence of acoustic features of a speech pattern is patterned into a series of transitions through a set of states based on statistical estimates. Speaker dependent recognition arrangements such as described in the article, "The DRAGON System-An Overview", by James K. Baker, appearing in the *IEEE Transactions on Acoustics, Speech and Signal Processing,* Vol. ASSP-23, No. 1, February 1975, pp. 24–29, have been devised in which acoustic spectral feature sequences corresponding to speech patterns are generated and evaluated in a series f hierarchical Markov models of acoustic features, words and language. The acoustic feature sequences are analyzed in Markov models of phonemic elements. The models are concatenated into larger acoustic elements such as words and the results are then processed in a hierarchy of Markov models, e.g., syntactic, contextual, to obtain a speech pattern identification. The use of concatenated phonemic element models and the complexity involved in unrestricted hierarchical Markov modeling, however, requires many hours of system training by each identified speaker to obtain a sufficient number of model tokens to render the Markov models valid.

A speaker indeendent recognition system described in the article, "On the Application of Vector Quantization and Hidden Markov Models to Speaker-Independent, Isolated Word Recognition", by L. R. Rabiner, S. E. Levinson, and M. M. Sondhi, appearing in *The Bell System Technical Journal,* Vol. 62, No. 4, April 1983, pp. 1075–1105, employs a relatively simple Markov model having a restricted number of states and state transitions. Advantageously, this speaker independent arrangement reduces the complexity of recognition processing so that the speed of identification of a speech pattern is less dependent on vocabulary size and the capabilities of the processing devices. As a result, real time recognition is obtained.

While speech recognition processing may be simplified using Markov modeling, the generation of the signals that form the models of reference patterns to which an unknown pattern is compared is complex and time consuming and subject to inaccuracies. These factors have inhibited the practical application of Markov model speech recognition. It is an object of the invention to provide improved automatic speech recognition based on Markov modeling that includes faster and more accurate model formation.

BRIEF SUMMARY OF THE INVENTION

The objects of the invention are achieved by forming a succession of Markov models that have continuous probability density functions with mixture components and that are convergent from a stored data base of speech pattern feature signal sequences, comparing the successive models until a prescribed similarity between successive models is achieved, and reestimating the last successive model so that a highly accurate Markov model template of the speech pattern is obtained.

The invention is directed to a speech analysis arrangement in which speech pattern reference templates are formed for speech recognition. In the training procedure, identified speech patterns are analyzed to generate successive sets of signals having continuous probability density functions, rather than having discrete representations. Each set is representative of a Markov model of the identified pattern. The speech pattern template is produced by iteratively generating succeeding Markov model signal sets starting with an initially selected Markov model signal set. Each iteration includes forming a set of signals having continuous density functions with mixture components representative of the current iteration Markov model of the identified speech pattern responsive to said frame sequences of acoustic feature signals and one of the previous Markov model signal sets and comparing the current iteration Markov model signal set with the previous Markov model signal set to generate a signal corresponding to the similarity therebetween. The iterations are terminated when the similarity signal is equal to or less than a predetermined value. The resulting template is then used as a reference pattern for unknown speech patterns being analyzed, according to known maximum likelihood techniques, but using patterns to be tested which are derived in an analogous fashion to that of the templates.

BRIEF DESCRIPTION OF THE DRAWING

FIG. 8 illustrates the acoustic feature sequence storage arrangement in the circuit of FIG. 7;

FIG. 10 shows the arrangement of signals in the state-frame store of the circuit of FIG. 7;

GENERAL DESCRIPTION

Figure 1:
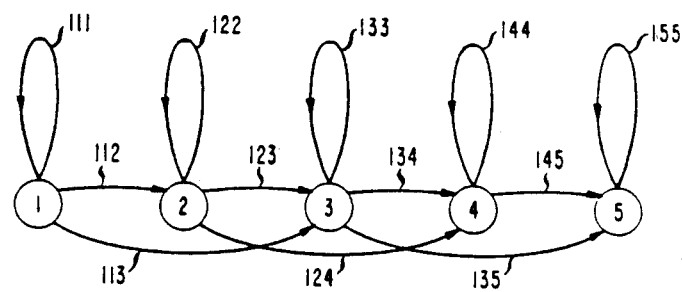
FIG. 1 shows a schematic diagram of a constrained hidden Markov model of a pattern such as used in the invention.

As is well known in the art, a hidden Markov model may be used to evaluate the probability of occurrence of a sequence of observations $O_1, O_2, \ldots O_t, \ldots, O_T$, where each observation $O_t$ may be either a discrete symbol or a continuous vector. The sequence of observations may be modeled as a probabilistic function of an underlying Markov chain having state transitions that are not directly observable. FIG. 1 illustrates such a model. Referring to FIG. 1, there are N, e.g., 5 states. The transitions between states are represented by a transition matrix $A=[a_{ij}]$. Each $a_{ij}$ term of the transition matrix is the probability of making a transition to state j given that the model is in state i. The output symbol probability of the model is represented by a set of functions $B=[b_j(O_t)]$, where the $b_j(O_t)$ term of the output symbol matrix is the probability of outputting observation $O_t$, given that the model is in state j. The model of FIG. 1 is constrained so that state 1 is always the initial state for the first time frame of the utterance, only a prescribed set of left-to-right state transitions are possible, and a predetermined final state is defined from which transitions to other states cannot occur. These restrictions are shown in the model state diagram of FIG. 1 in which state 1 is the initial state, state 5 is the final or absorbing state, and the prescribed left-to-right transitions are indicated by the directional lines connecting the states.

From state 1 in FIG. 1, it is only possible to reenter state 1 via path 111, to proceed to state 2 via path 112, or to proceed to state 3 via path 113. Transitions are restricted to reentry of a state or entry to one of the next two states. Such transitions are defined in the model as transition probabilities. For example, a speech pattern currently having a frame of feature signals in state 2 has a probability of reentering state 2 of $a_{22}$, a probability $a_{23}$ of entering state 3 and a probability of $a_{24}=1-a_{21}-a_{22}$ of entering state 4. The probability $a_{21}$ of entering state 1 or the probability $a_{25}$ of entering state 5 is zero and the sum of the probabilities $a_{21}$ through $a_{25}$ is one.

In each state of the model, the current feature frame may be identified with one of a set of predefined output symbols or may be labeled probabilistically. In this case, the output symbol probability $b_j(O_t)$ corresponds to the probability assigned by the model that the feature frame symbol is $O_t$. The model arrangement then comprises a matrix $A=[a_{ij}]$ of transition probabilities and a technique of computing $B=b_j(O_t)$, the feature frame symbol probability in state j.

According to the invention, a Markov model is formed for a reference pattern from a plurality of sequences of identified training patterns and the output symbol probabilities are multivariate Gaussian function probability densities. The constrained hidden Markov model is used to derive a set of reference pattern templates, each template representative of an identified pattern in a vocabulary set of reference patterns. The Markov model reference templates are then utilized to classify a sequence of observations as one of the reference patterns based on the probability of generating the observations from each Markov model reference pattern template. The unknown pattern can then be identified as the reference pattern with the highest probability.

For speech recognition, an unknown input speech pattern is analyzed to generate a time frame sequence of acoustic features. Each feature may be a spectral feature, a linear prediction coefficient vector or other acoustic features well known in the art. The generated feature sequence for the unknown speech pattern, e.g., a word or phrase, forms the observation sequence O and the probability that O has been generated by a Markov model reference template $\lambda$ of a word or phrase of a vocabulary set is determined in accordance with $$L(O|\lambda) = \sum_{i_1 i_2 \ldots i_T} \pi_{i_1} b_{i_1}(O_1) a_{i_1 i_2} \ldots a_{i_{T-1} i_T} b_{i_T}(O_T) \qquad (1)$$

where $i_1, i_2, \ldots, i_T$ is the sequence of Markov model states and $O_1, O_2, \ldots, O_T$ is the observed sequence of speech pattern frame features. Equation (1) may be written in terms of the forward partial probability $\alpha_t(i)$ defined as $$\alpha_t(i) = L(O_1, O_2 \ldots O_t \text{ and state } i \text{ at time } t | \lambda) \qquad (2)$$

$\alpha_{t+1}(j)$ can then be evaluated as $$\alpha_{t+1}(j) = \sum_{i=1}^{N} \alpha_t(i) a_{ij} b_j(O_{t+1}) \qquad (3)$$

$t = 1, 2, \ldots, T-1$ so that equation (1) becomes $$L(C|\lambda) = \sum_{j=1}^{N} \alpha_T(j) \qquad (4)$$

After the probability signal for each Markov model reference pattern has been generated, the input speech pattern may be identified as the reference pattern model r corresponding to the highest likelihood signal $L(O|\lambda^r)$ (r=1,2, . . . ,R), where R is the number of words in the vocabulary.

The recognition scheme disclosed in U.S. patent application Ser. No. 434,516, filed Sept. 2, 1982, discloses an arrangement that utilizes vector quantization to generate Markov model output symbol probability signals $b(O_t)$. While vector quantization techniques permit the use of permanently stored probability tables, the resulting model probabilities are only an approximation to the actual likelihood. The graph of FIG. 2 illustrates the effect of the vector quantized approximation.

Figure 2:
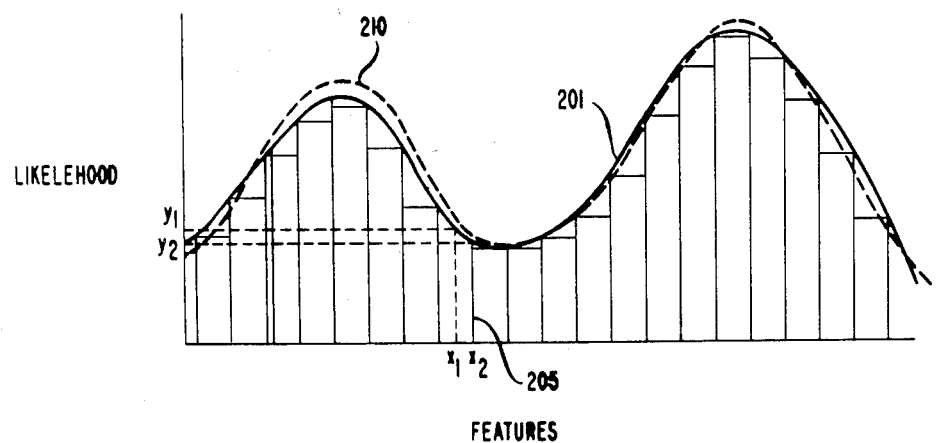
FIG. 2 shows waveforms illustrating the likelihood of features and discrete and continuous approximations thereto for a Markov model.

In FIG. 2, curve 201 represents the actual likelihood $b(O_t)$ as a function of acoustic features, and the vertical lines correspond to the discrete probability values of the discrete vector quantized features. An input acoustic feature derived from a speech pattern is first quantized to the nearest prototype feature and the probability of the prototype feature is selected as $b(O_t)$. It is readily apparent that an input feature at $x_1$ on the feature axis corresponds to a probability $y_1$ from curve 201 but that the probability for the nearest prototype vector 205 is $y_2$. The difference between $y_1$ and $y_2$ is the error due to quantization and the error affects the accuracy of speech pattern recognition.

It is therefore desirable to reduce the deviation from the actual probability density function 201 by using a multivariate Gaussian function approximation of the form $$b_j(x) = \sum_{k=1}^{M} c_{jk} N(x, \mu_{jk}, \sigma_{jk}) \qquad (5)$$

where N (x, $\mu$, $\sigma$) denotes a D-dimensional normal density function of mean vector $\mu$ and covariance matrix $\sigma$, M is the number of mixtures, and C is the mixture gain matrix. Such a multivariate Gaussian function is illustrated as curve 210 in FIG. 2. The multivariate Gaussian function of equation 5 is a linear combination of M Gaussian functions adjusted according to mixture coefficients C so that the probability density of the Markov model can be approximated to any degree of accuracy. The combination is analogous to the approximation of a function using sine and/or cosine waves in Fourier analysis. In accordance with the invention, the difference between the likelihood signal $b(O_t)$ obtained from curve 210 (derived from equation (5)) and the actual probability density curve 201 is small so that the accuracy of speech pattern recognition from Markov model templates using $b(O_t)$ is substantially improved.

Figure 3:
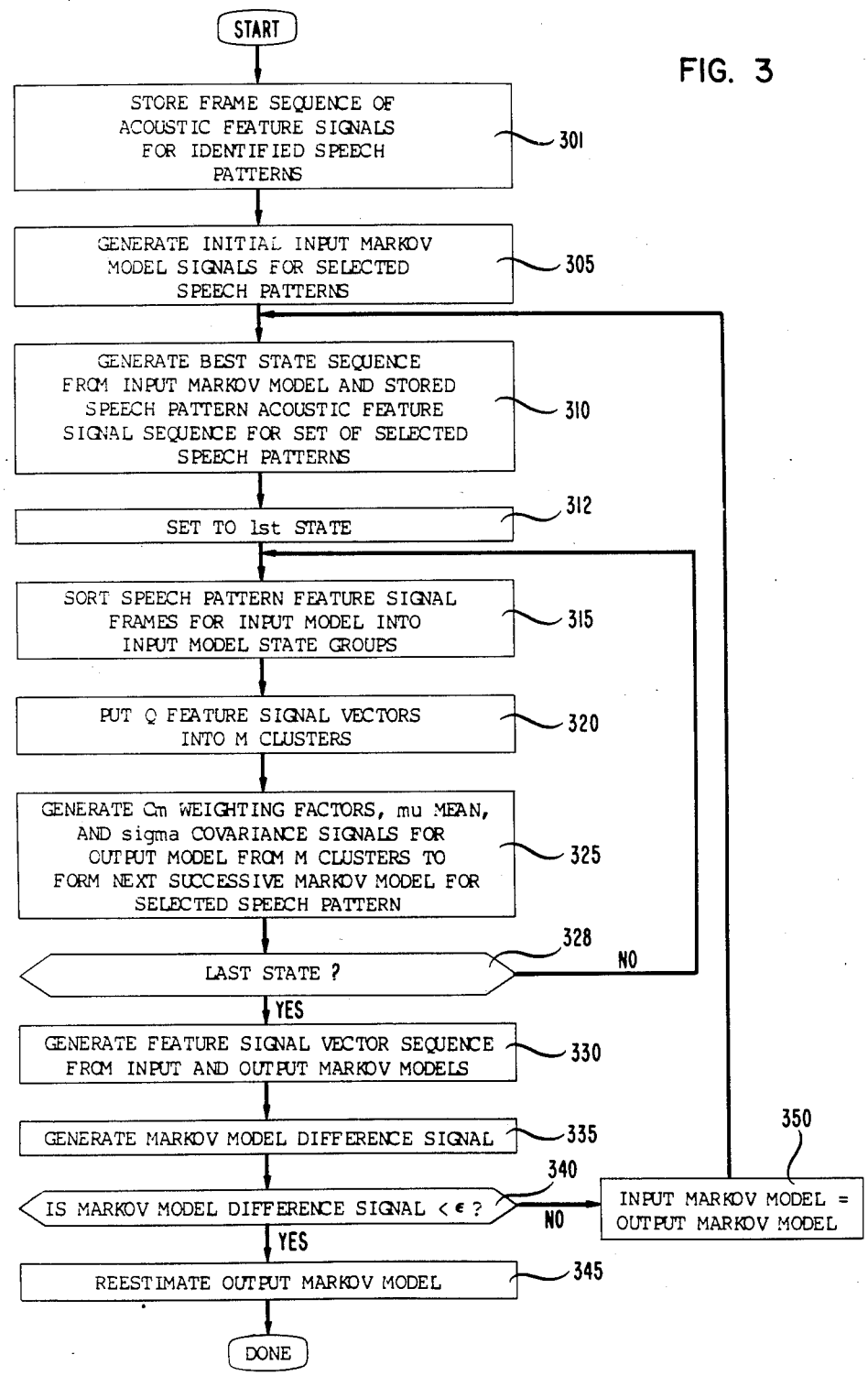
FIG. 3 depicts a general flow chart of the method of generating a Markov model illustrative of the invention.

The flow chart of FIG. 3 illustrates the general method of forming a Markov model template from a training set of speech patterns. Initially, a large number of speech patterns is analyzed to generate frame sequences of acoustic features. Assume for purposes of illustration that the speech patterns correspond to utterances of the digits 0 through 9 and that a linear prediction analysis is made for each digit utterance. A single utterance of the digit 1, for example, may result in a sequence of acoustic feature signals $$O_1^1, O_2^1, \ldots, O_{n_1}^1 \qquad (6)$$

for $n_1$ time frames. Each acoustic feature signal O is a multidimensional linear prediction coefficient (LPC) vector well known in the art. Alternatively, cepstral or other features may be used. The acoustic feature sequences for a large number of such utterances of all digits are stored for use in forming Markov model templates. The speech pattern storing operation is indicated in step 301. An initial Markov model is then generated for a selected digit as per step 305. The Markov model may be selected arbitrarily, or may correspond to a previously used Markov model template that is to be improved. The model for word r comprises a prescribed set of transition probability matrix signals $A^r = [a^r_{ij}]$ and a prescribed set of output symbol probability signals derived from a Markov model $$B^r = \{c^r_{mj}, \mu^r_{mjk}, \sigma^r_{mjk}\} \qquad (7)$$

$$1 \leq m \leq M, 1 \leq j \leq N, 1 \leq k, 1 \leq D$$

corresponding to a multivariate Gaussian function where M is the number of mixture components, N is the number of states, and D is the number of dimensions of the feature vector for each frame.

The feature signals O for the selected digit are then combined with the current Markov model signals to produce the best state sequence of feature signals according to the current Markov model for the digit as per step 310. This is accomplished by assigning feature signal frames to the states of the Markov model in FIG. 1 using standard Viterbi matching techniques such as described in the aforementioned article, "On the Application of Vector Quantization and Hidden Markov Models to Speaker-Independent, Isolated Word Recognition", by L. R. Rabiner et al, so that a maximum likelihood score is obtained.

Such a procedure is illustrated as follows. Each frame sequence of feature signals for an utterance of the selected digit is applied to the current model and all possible paths of the frames through the states of the model are evaluated to determine the path having the maximum likelihood. Given the current model $\lambda^r$ and the observation sequence O of frame feature signal, the scoring procedure may be stated as $$\delta_1(i) = \ln[\pi_1 b_1{}^r(O_1)], L = 1 \qquad (8)$$
$$= -1.E\ 75 \quad i = 2,3,\ldots,N$$

$$\delta_t(j) = \max\{\delta_{t-1}(i) + \ln[a^r_{ij}] + \ln[b_j{}^r(O_t)]\}$$

$$\max(1, j-2) \leq i \leq j$$

for $2 \leq t \leq T, i \leq j \leq N \qquad (9)$ $$P = \sigma_T(N) \qquad (10)$$

The frames of the selected digit are then sorted according to the optimum state sequence so that a set of LPC vector signal frames are assigned to each state of the Markov model as per step 315. This procedure is repeated for each of the words in the training set for digit r. When finished, for each state, the LPC feature vector signals of the Q frames of all the selected digit utterances assigned to the state are clustered into M groups using a clustering procedure as per step 320. The clustering procedure disclosed in the article "Considerations in applying clustering techniques to speaker-independent word recognition", by L. R. Rabiner and J. G. Wilpon, in *Journal of the Acoustical Society of America*, 66(3), September 1979, pp. 663-673, or other clustering arrangements may be used.

Signals corresponding to a new Markov model are formed from the clustered vector signals of step 320 in step 325. The new $c_{mj}$ coefficients are produced in accordance with $$c_{mj}^r = \frac{\text{number of feature vectors in cluster } m \text{ for state } j}{Q} \quad (11)$$

The new mean signals $\mu_{mjk}$ are formed according to $$\mu_{mjk}^r = \frac{\sum\limits_{\substack{p=1 \\ \epsilon r(p)=m}}^{Q} [FS(p)]_k}{\text{number of feature vectors in cluster } m, \text{ for state } j} \quad (12)$$

where $r(p)=m$ corresponds to the pth vector, $FS(p)$, being in cluster m, and $[FS(p)]_k$ corresponds to the kth component of vector $FS(p)$, and the new covariance signals $\sigma_{mjk}$ are generated using $$\sigma_{mjkl}^r = \left[ \frac{\sum\limits_{\substack{p=1 \\ \epsilon r(p)=m}}^{Q} [FS(p)]_k [FS(p)]_l}{\text{number of feature vectors in cluster } m, \text{ for state } j} - (\mu_{mjk}^r)(\mu_{mjl}^r) \right] \quad (13)$$

where m is the mth cluster and k is the kth component of the LPC feature vector signal. The loop from steps 315 to 325 is iterated over the set of states 1 to N of the selected digit.

At this point, the current Markov model has been used to form a next succeeding Markov model of the selected digit characterized by the $c_{mj}$ coefficient signals, the $\mu_{mjk}$ mean signals and the $\sigma_{mjk}$ covariance signals of equations (10), (11) and (12). It can be rigorously shown that the successive Markov models formed by this method are convergent. In accordance with the invention, a signal corresponding to each Markov model is formed so that the models can be compared quantitatively until the difference between successive Markov models is less than a predetermined value.

Model comparison is done by generating frame sequences of feature signal vectors from the current and next successive Markov models. In the formation of a sequence of feature signal vectors, the model begins in state i=1. An observation frame vector, O, is randomly chosen according to the probability curve $b_1(O)$ (waveform 210 of FIG. 2) for the model. A transition probability is then randomly selected and the state transition given by $a_{1j}$ is made. The resulting transition puts the model into state i (e.g., j=1,2,3). A feature signal vector, O, is then randomly generated according to the probability $b_j(O)$, and another feature state transition is generated. This Monte Carlo type procedure is continued to produce a sequence of feature signal vectors and the likelihood of occurrence of the sequence is determined in accordance with equation (1) for the current Markov model $\lambda$. The procedure is repeated for the a and b probability signals of the next successive Markov model $\lambda$. Signals corresponding to the likelihood of the set of feature vectors $L(O|\lambda)$ and $L(O|\lambda)$ for models $\lambda$ and $\lambda$ are produced (step 335) and compared (step 340) by means of a distance signal $$d(\lambda^r, \lambda^r) = \frac{\ln L(O|\lambda^r) - \ln L(O|\lambda^r)}{T} \quad (14)$$

where T is the total number f frame feature observations generated by the model. If the Markov model distance signal of step 335 is greater than a predetermined value $\epsilon$, the just produced Markov model signals are stored as the input Markov model (step 350) for the next iteration and step 310 is reentered for another iteration of the Markov model generation loop from step 310 to step 340.

When the Markov model difference signal is reduced below $\epsilon$, step 345 is entered and the Markov model signals formed in the last iteration of the Markov model generation loop is reestimated to improve its accuracy. The reestimation is performed in accordance with the well-known Baum method described in the article, "An Inequality and Associated Maximization Technique in Statistical Estimation for Probabilistic Functions of Markov Processes", by L. E. Baum, appearing in *Inequalities-III*, pp. 1-8, 1972. More particularly, for a set of S training versions of a word, a likelihood signal $$L = \prod_{s=1}^{S} \alpha_{T_s}^{(s)}(N) \quad (15)$$

is iteratively generated for the frame feature observation sequences of the selected digit from store 715

$$O =$$

$$O_1^{(1)}, O_2^{(1)}, \ldots, O_{T_1}^{(1)}, O_1^{(2)}, O_2^{(2)}, \ldots, O_{T_2}^{(2)}, \ldots, O_1^{(S)}, O_2^{(S)}, \ldots, O_{T_S}^{(S)}$$

where $O_t^{(s)}$ is a D-dimensional feature signal vector for $1 \leq s \leq S$, $1 \leq t \leq T_s$.

$$\alpha_t^{(s)}(j) = L(O_1^{(s)} O_2^{(s)} \ldots O_t^s \text{ and } j|\lambda) \quad (16)$$

is the forward partial likelihood of the first t observations of observation sequence O based on the current Markov model that ends in state j and $\lambda$ is the current model. The observation sequence may be provided by the input utterances of the digit from one or more speakers.

The successive values of the likelihood signal L are compared in accordance with $$1 - \frac{L}{\overline{L}} \leq \theta \quad (17)$$

where $\overline{L}$ is the previously generated likelihood signal, and L is the currently generated likelihood signal. The iterations are continued until this condition is satisfied or a predetermined number of iterations has been performed. Each time the inequality of equation (17) is not met, the signals of the Markov model $a_{ij}$, $c_{jm}$, $\mu_{jm}$, and $\sigma_{jm}$ are modified and a new value of the likelihood signal is formed. It can be shown that the estimating procedure converges so that the values of the Markov model parameter signals at the end of each iteration provide improved accuracy. The modification of the parameter signals in each iteration is performed in accordance with the following:

$$a_{ij} = \frac{\sum_{s=1}^{S} \sum_{t=1}^{T_s-1} \alpha_t^{(s)}(i) a_{ij} b_j(O_{t+1}^{(s)}) \beta_{t+1}^{(s)}(j)}{\sum_{s=1}^{S} \sum_{t=1}^{T_s-1} \alpha_t^{(s)}(i) \beta_t^{(s)}(i)} \quad (18)$$

$$c_{jm} = \frac{\sum_{s=1}^{S} \sum_{t=1}^{T_s} \rho_t^{(s)}(j,m) \beta_t^{(s)}(j)}{\sum_{s=1}^{S} \sum_{t=1}^{T_s} \alpha_t^{(s)}(j) \beta_t^{(s)}(j)} \quad (19)$$

$$\mu_{jm} = \frac{\sum_{s=1}^{S} \sum_{t=1}^{T_s} \rho_t^{(s)}(j,m) \beta_t^{(s)}(j)(O_t^{(s)})}{\sum_{s=1}^{S} \sum_{t=1}^{T_s} \rho_t^{(s)}(j,m) \beta_t^{(s)}(j)} \quad (20)$$

$$\sigma_{jm} = \frac{\sum_{s=1}^{S} \sum_{t=1}^{T_s} \rho_t^{(s)}(j,m) \beta_t^{(s)}(j)(O_t^{(s)} - \mu_{jm})(O_t^{(s)} - \mu_{jm})'}{\sum_{s=1}^{S} \sum_{t=1}^{T_s} \rho_t^{(s)}(j,m) \beta_t^{(s)}(j)} \quad (21)$$

where $1, j \leq N$, $1 \leq m \leq M$ $$\beta^{(s)}(j) = L(O_{it+1}^{(s)} O_{it+2}^{(s)} \ldots O_{iT_s}^{(s)} | j \text{ and } \lambda) \quad (22)$$

and $$\rho_t^{(s)}(j,m) = \quad (23)$$

$$\sum_{n=1}^{N} \alpha_{t-1}^{(s)}(n) a_{nj} c_{jm} \frac{\delta b_j}{\delta c_{jm}} O_t^{(s)}$$

After the comparison of successive likelihood values in step 340 provides a signal less than $\theta$ or a prescribed number of iterations have been performed, the Markov model signals corresponding to the last likelihood signal are stored as the template for the current digit.

DETAILED DESCRIPTION

Figure 4:
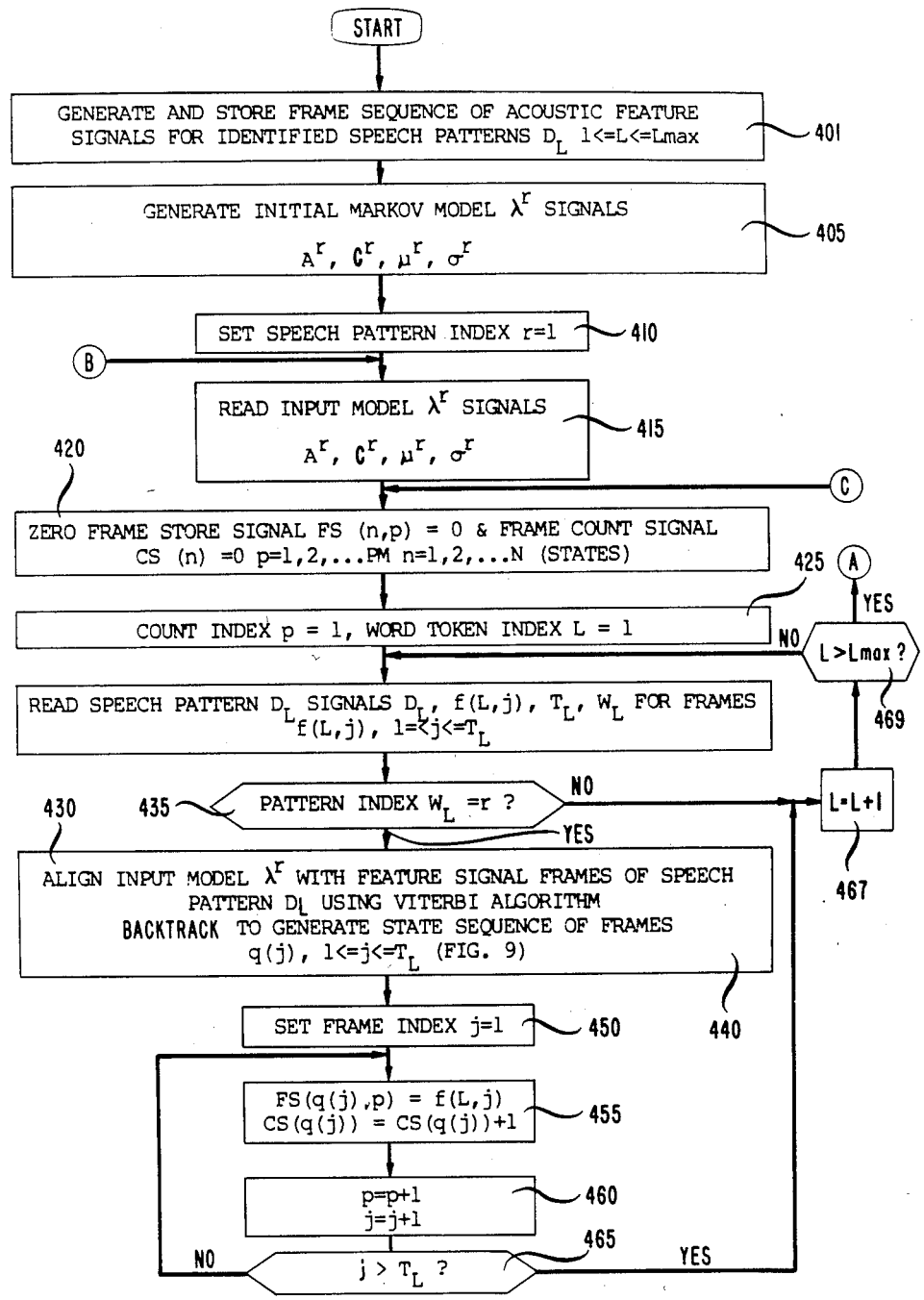
FIGS. 4-6 depict a detailed flow chart of the Markov model generating method of FIG. 3.
Figure 5:
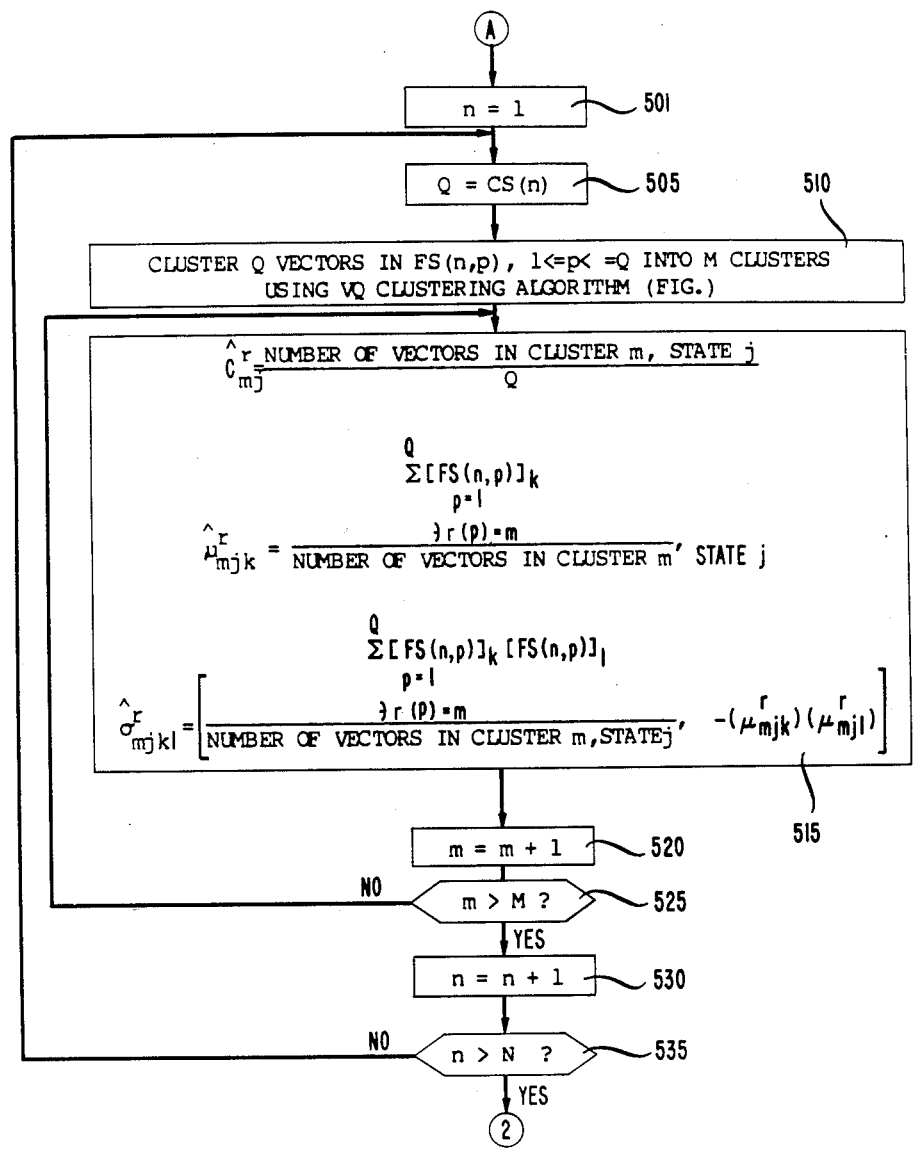
Figure 6:
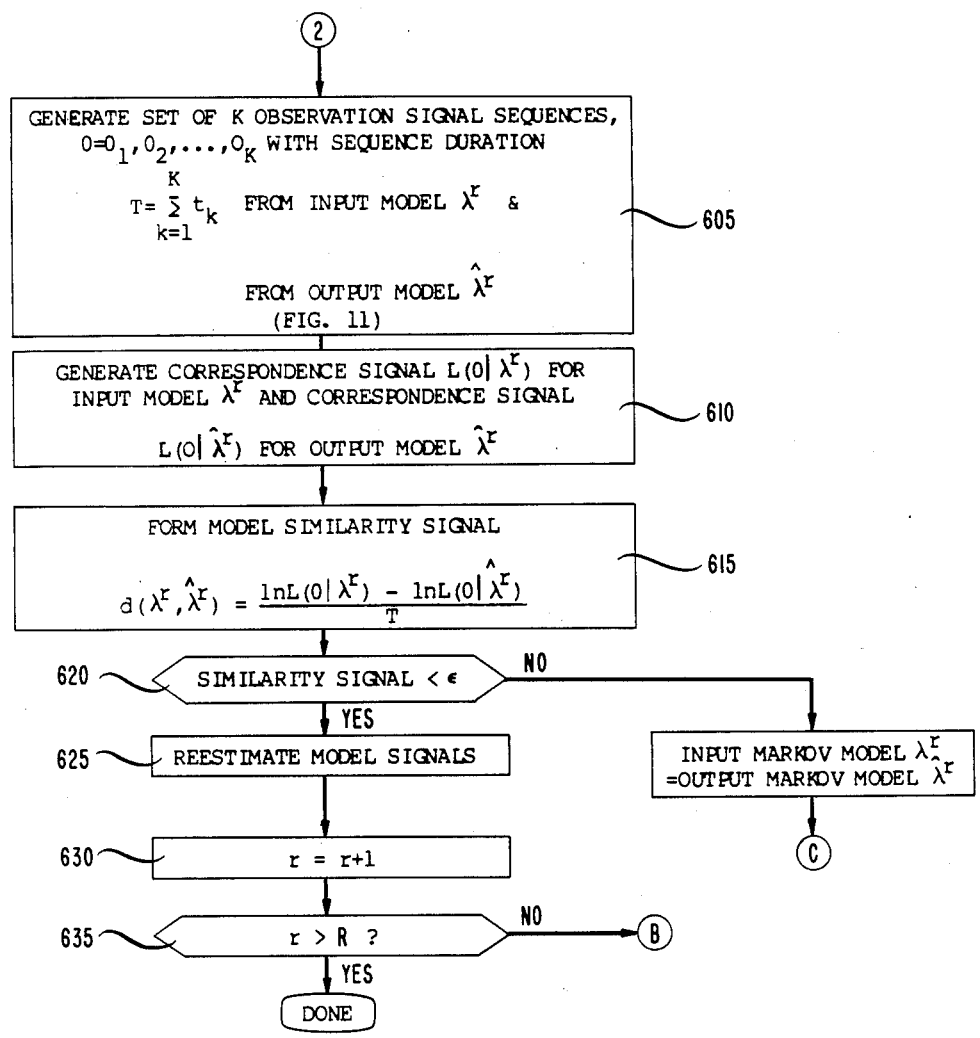
Figure 7:
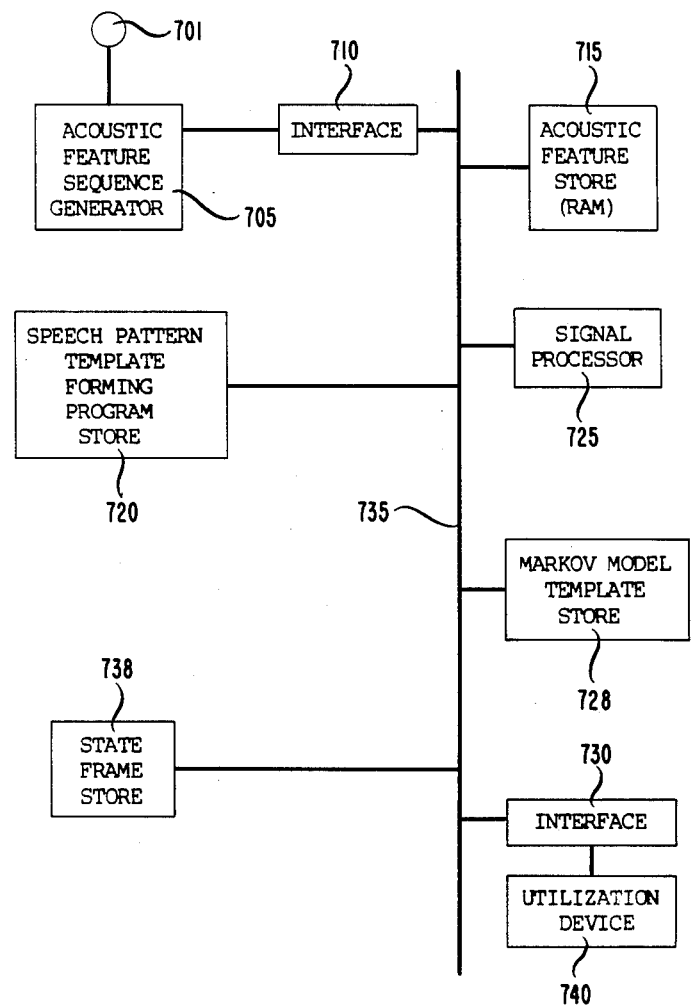
FIG. 7 shows a block diagram of a Markov model generating circuit illustrative of the invention.

FIGS. 4, 5 and 6 show detailed flow charts illustrating the formation of Markov model templates in accordance with the invention, and FIG. 7 is a block diagram of a processing circuit that may be used to implement the method of FIGS. 4, 5 and 6. Referring to FIG. 7, identified utterances are received at electroacoustic transducer 701, and electrical signals produced by the transducer responsive to each utterance are applied to acoustic feature sequence generator 705. The feature generator is operative to perform a linear prediction analysis of the input utterance from which a sequence of LPC coefficient vector signals characteristic of the utterance is obtained. The vector signal sequence is transferred to acoustic feature sequence store 715 via interface 710 and bus 735. Feature sequence generator 705 may comprise a microprocessor such as the type MC68000 manufactured by Motorola Inc., and described in the publication MC68000 16 *Bit Microprocessor User's Manual,* second edition, Motorola Inc., 1980.

The LPC vector signal sequences from feature signal generator 705 may represent the utterances of identified digits of one or more speakers and provide a sufficient data base of speech feature signals for the digits to form Markov models therefrom. FIG. 8 illustrates the manner in which the digit vector signal sequences are stored. Each entry into store 715 comprises the frame sequence of feature vector signals $O_1, O_2, \ldots, O_{T_i}$ resulting from the digit utterance, a signal $w_i$ identifying the digit that is spoken and a signal $T_i$ corresponding to the number of frames in the digit utterance. The first entry, for example, is a sequence of $T_i$ frame LPC vector signals $O_1, O_2, \ldots, O_{T_i}$, the digit identification $w_1$ and the number of frames signal $T_i$. The entries may be stored in any order and are addressable by digit identification codes $w_i$.

Signal processor 725 is adapted to perform the operations required by the flow charts of FIGS. 4–6 to form the Markov model templates under control of the permanently stored instructions in speech pattern template forming program store 720. The resulting Markov model templates are transferred to template store 728 and are supplied therefrom to utilization device 740. Device 740 may be an automatic speech recognizer that may be of the type illustrated in FIGS. 13 and 14 or may be a device adapted to permanently store Markov model templates for use in speech recognition equipment. Processor 725 may be a general purpose data processor well known in the art or may be a microprocessor such as the MC68000. Alternatively, processor 725, bus 735, program store 720, and random access memories 715 and 728 may be the type OB68K1A MC68000/MULTIBUS single board computer manufactured by Omnibyte Corporation, West Chicago, Ill. A Q bus arrangement could also be used. Store 720 may comprise a read-only type memory permanently storing instructions that implement the steps shown in the flow charts of FIGS. 4–6. These instructions are listed in FORTRAN language form in Appendix A hereto.

Referring to the flow chart of FIG. 4, the frame sequence of acoustic feature signals is generated in feature signal generator 705 for identified spoken digit patterns $D_L$ and the LPC feature signals therefrom are placed in successive positions of store 715 as per step 401. When Lmax patterns, e.g., 1000, have been analyzed and the feature signal sequences therefor have been stored, the initial Markov model is produced (step 405) and stored in template store 728. Alternatively, Markov model signals may have been previously stored in template store 728. The speech pattern (digit) index is set to r=1 in step 410 and the Markov model template formation process is started in step 415 for the currently selected digit pattern. The initial Markov model signals for the current digit are obtained from the template store. This initial set of signals may be arbitrarily selected, e.g., $a_{ij} = \frac{1}{3}$ for $j = i, i+1, i+2$; $i = 1, 2, \ldots, N-2$, $a_{N-1,N} = \frac{1}{2}$, $a_{N-1,N-1} = \frac{1}{2}$, $a_{NN} = 1.0$; all other $a_{ij} = 0$, $C_{mj} = 1/M$, $\mu_{mj} = 0$, $\sigma_{mj} = 1$, or may comprise previously formed template signals which are to be improved through the use of a different or expanded data base of utterance feature signals.

Steps 420 through 465 are operations directed to aligning the frame sequences of stored feature signals for the current digit with the current Markov model $\lambda^r$ and assigning the feature signal frames to the states of the model. At the beginning of the alignment, the frame store index $FS(n,p)$ and the frame count index $CS(n)$ are set to zero for the count sequence $p = 1, 2, \ldots, PM$, e.g., $PM = 5000$, and the Markov model state sequence $n = 1, 2, \ldots, N$ (step 420). The count and word token indices p and L are set to 1 (step 425) and the feature signals corresponding to $f(L,j)$, $T_L$, and $W_L$ for digit pattern $D_L$ are supplied from store 715 to signal processor 725 via bus 735.

The digit utterance entries in store 715 are read by processor 725 in step 430 and the digit identification code $W_L$ is compared to the current digit being processed (step 435). If the feature signal sequence corresponds to the current digit being processed, step 440 is entered in which the feature signal frames of the entry are aligned with the current Markov model $\lambda^r$ through use of equations (7), (8) and (9). A flow chart detailing the alignment process is shown in FIG. 9.

Figure 9:
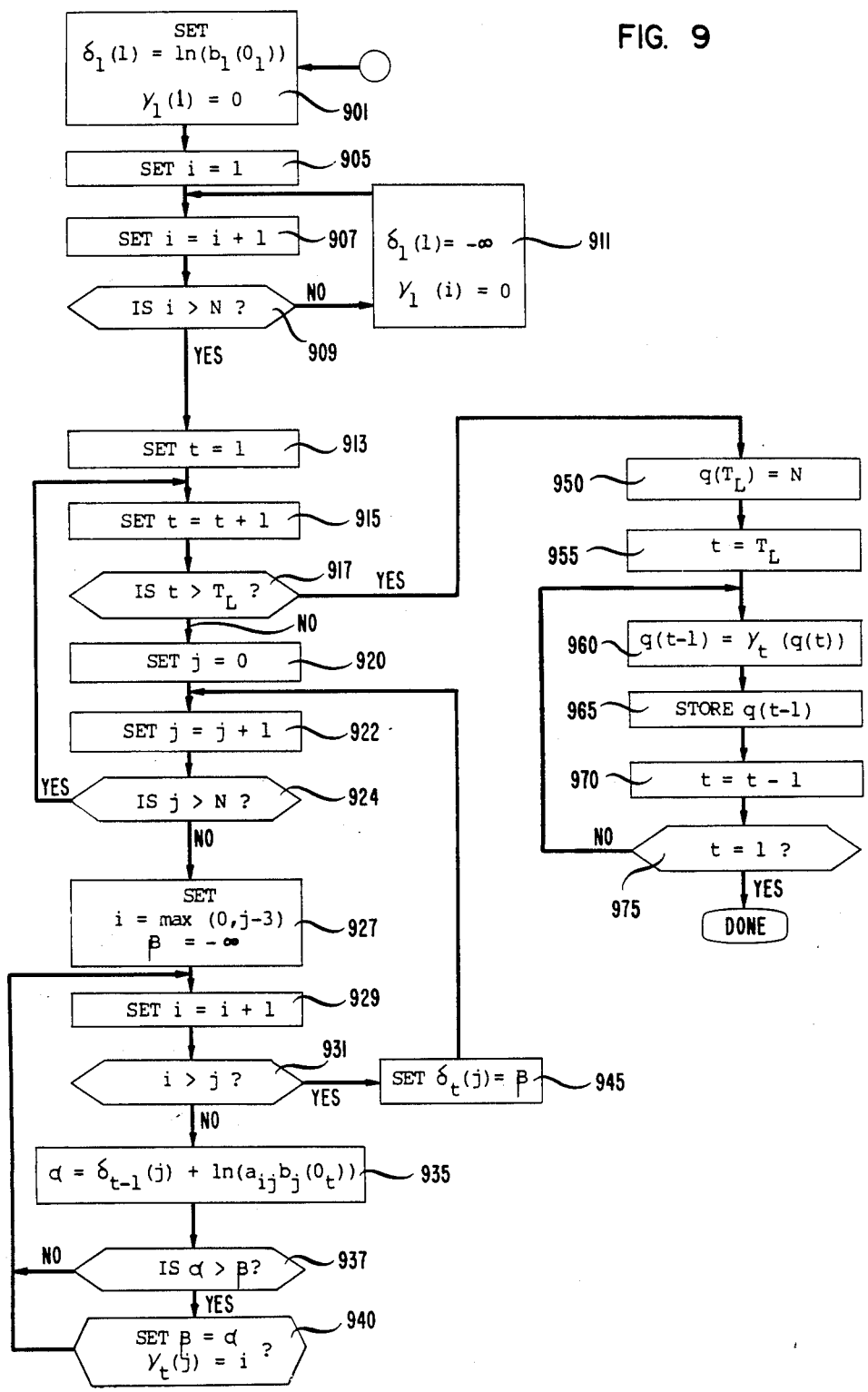
FIG. 9 shows a detailed flow chart illustrating Markov model speech pattern time frame alignment operations in FIG. 4.

In general, the flow chart of FIG. 9 follows equations (8), (9), and (10) and shows the operations of signal processor 725 in forming a signal $\tau$ (N) for each sequence of feature vector observation signals and signals $\gamma(i)$ representative of the most probable path through the states of the Markov model shown in FIG. 1. The arrangement of FIG. 9 applies the transition probability signals $a_{ij}$ and the observation probability signals $b_j(O_t)$ of the current Markov model $\lambda^r$ to the frames t of the feature signal frame sequences stored in acoustic feature store 715 to sort the feature signal frames into states. The resulting sorted frames are then stored in state frame store 728.

Referring to FIG. 9, step 901 is entered from decision step 435, and the initial probability signal for the first state $(i=1)$ is generated. The state index is then set to 1 (step 905) and the loop including steps 907, 909, and 911 is iterated for states 2, 3, ..., N to initially set the probability signals $\sigma_1(i)$ to $-\infty$ and the frame state path signals $\gamma_1(i)$ to 0.

After the probability and path signals for state N have been reset, the sequence frame index is set to 1 and incremented in steps 913 and 915. Steps 915 through 940 correspond to equations (8) and (9) in which the probability of each feature observation frame sequence is evaluated, and the paths for the sequence based on the current Markov model are determined. The evaluation is done through the range of feature signal observation frames from frame $t=2$ to the last frame $T_L$ as indicated in decision step 917. Until frame $T_L$ has been processed, each destination state j in the range between $j=1$ to $j=N$ is selected (steps 920, 922 and 924). For each destination state j, the source states i in the permitted range $\max(1,j-2) \leq i \leq j$ are sequentially selected (steps 927 and 929) and a signal representative of the probability of the feature signal observation sequence following the path given in step 935 is generated.

The maximum probability path signal for equation (9) is selected in steps 937 and 940. When $i>j$ (step 931), the maximum probability signal $\sigma_t(j)$ is stored for state j (step 945). The loop from step 922 to 945 is iterated through the destination states $1 \leq j \leq N$ so that all possible frame state paths for the frames from $t=2$ to $t=T_L$ are traversed. When $t>T_L$, the probability signal formation is complete and step 950 is entered from decision step 917.

Signals q(t) in the flow chart of FIG. 9 represent the maximum likelihood estimates of the states of the feature observation frames based on the current Markov model. Estimated state signal $q(T_L)$ is initially set to last state N in step 950 and the frame index t is set to the last frame $T_L$ of the feature observation sequence in step 955. The loop from step 960 to step 975 is then iterated so that the frames $\gamma_t(q(t))$ of the observation sequence obtained in step 940 in the frame state path probability signal formation are sorted according to state (step 960) and stored in frame state store 738 (step 965). The probability signal and back track processing of FIG. 9 are performed in signal processor 725 as controlled by the instructions stored in program store 720 listed in FORTRAN language in Appendix B hereto.

After the alignment and sorting process of step 440 is completed, the frames of the digit entry feature signals have been assigned to the states q(j) of model $\lambda^r$. The frame index j is set to 1 (step 450) and the loop including steps 455, 460 and 465 is iterated through the speech pattern frames. As per step 455, the feature signal vector observation f(L,j) of each frame is stored as signal $FS(q(j),p)$ in state frame store 738 as addressed by Markov model state and the count of frames signal $CS(q(j))$ in each state is incremented. The count and frame indices p and j are incremented in step 460, and the frame to be processed is tested to determine whether all entry frames have been sorted (step 465). When j is greater than $T_L$, step 467 is entered in which the entry index L is incremented. Until entry index L is greater than the last entry number Lmax, the entries in store 715 are successively addressed in step 430, and the frames of the entries corresponding to the current digit being processed are sorted as per steps 440 through 465.

When the last entry for the current digit has been processed according to the flow chart of FIG. 4, the feature signal frames for all digit entries have been sorted into states in accordance with the current Markov model signals. FIG. 10 illustrates the arrangement of feature signals in frame state store 738. The frames assigned to state 1 are sequentially identified in store locations addressed by state 1, and the number of state 1 frames CS(1) is inserted at the end of the state 1 sequence. The frame assignments for the other states of model $\lambda^r$ are similarly stored in store 738.

The flow chart of FIG. 5 illustrates the operation of processor 725 in separating the frame feature signals of each state of frame state store 738 into clusters and generating a new set of Markov model signals $c_{mj}$, $\mu_{mjk}$, and $\sigma_{mjk}$ from the clustered feature signals. Step 501 is entered from step 469 of FIG. 4 and state index n and the total number of feature vector signals Q are set to 1 and CS(n) in steps 501 and 505, respectively. The Q feature signal vectors in the nth state stored in framestate store 738 are sorted into M clusters as per step 510 using the vector quantization clustering algorithm described in the article, "Distortion Performance of Vector Quantization for LPC Voice Coding", by Bing-Hwang Juang, David Y. Wong and Augustine H. Gray, Jr., appearing in the *IEEE Transactions on Acoustics, Speech and Signal Processing*, Vol. ASSP-30, No. 2, April 1982, pp. 294–303. The clustering is performed by signal processor 725 under control of program store 720. The permanently stored instructions for the clustering in the program store are set forth in FORTRAN language form in Appendix C hereto.

Subsequent to the clustering of the nth state feature signals, the parameters for the next successive Markov model, $c_{mj}$, $\mu_{mjk}$, and $\sigma_{mjk}$, are generated according to step 515. The cluster index m is incremented in step 520 and the occurrence of the last cluster M is checked in step 525. When the last cluster has been processed, the state index n is incremented (step 530) and the occurrence of the last state N is checked in step 535. Until state N clustering and Markov model parameter formation are complete, steps 505 through 535 are iteratively performed for the sequence of states 1, 2, ..., N.

Figure 11:
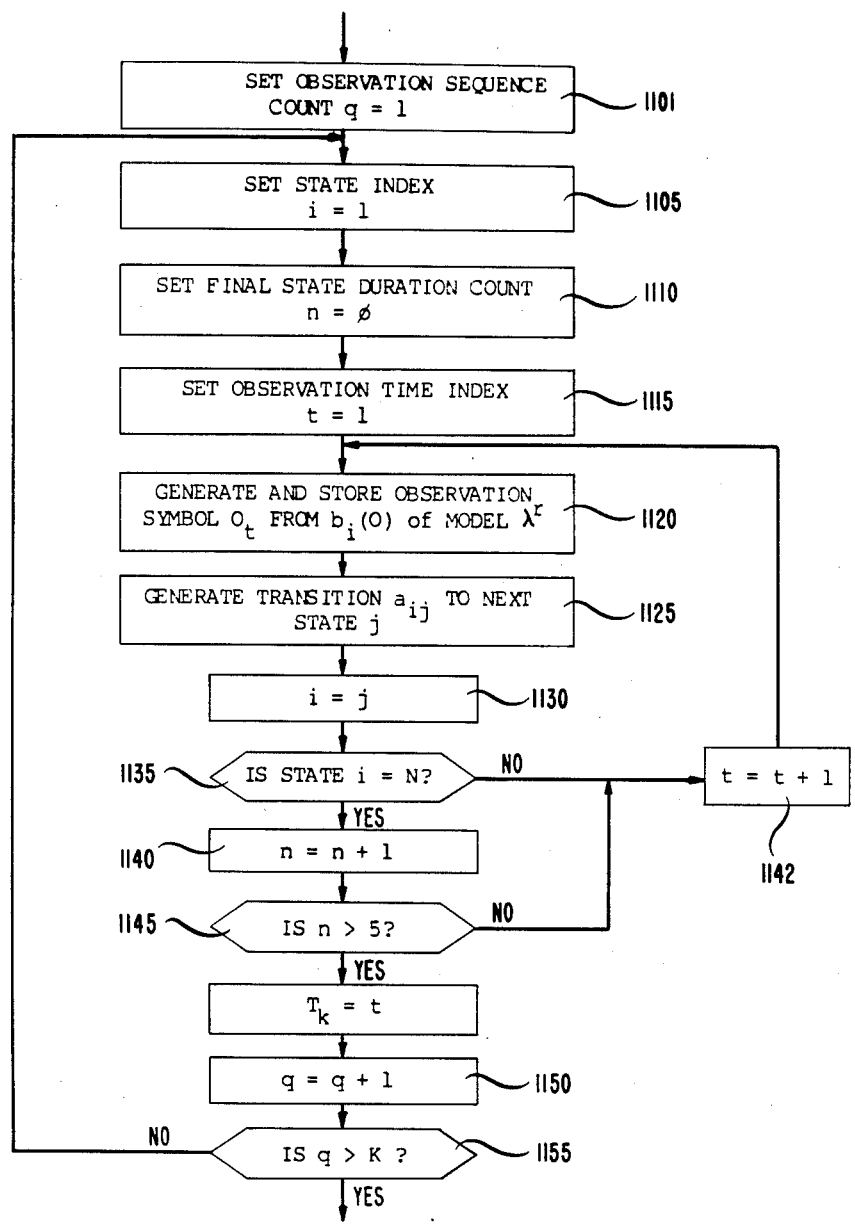
FIG. 11 is a flow chart detailing the observation symbol sequence formation of FIG. 6.

After all Markov model signals have been formed in accordance with FIG. 5, the current Markov model $\lambda^r$ and next succeeding Markov model $\lambda^r$ are compared through the operations of the flow chart of FIG. 6. Step 605 of FIG. 6 is entered from step 535 of FIG. 5 and a set of K observation signal sequences $$O = O_1{}^1 O_2{}^1 \ldots O_{T_1}^1 O_1{}^2 O_2{}^2 \ldots O_{T_2}^2 \qquad (24)$$
$$O_1{}^k O_2{}^k \ldots O_{T_k}^k \ldots O_1{}^K O_2{}^K \ldots O_{T_K}^K$$
$$O = O_1, C_2, \ldots, O_K$$

each with sequence duration $$T = T_k \text{ from } k=1 \text{ to } K \qquad (25)$$

and with total duration $$T = \sum_{k=1}^{K} T_k \qquad (26)$$

are generated from the current Markov model $\lambda^r$. The feature signal observations of each frame sequence are produced through random selection of observation vectors using the observation vector probabilities b and random selection of the transition probabilities a of the model $\lambda^r$. A detailed flow chart illustrating the observation sequence formation of step 605 is shown in FIG. 11. The instructions in store 720 for step 605 are listed in FORTRAN language form in Appendix D.

Initially, FIG. 11 is entered from step 535 in FIG. 5, and the feature signal observation count index q as well as the model state index i are set to 1 in steps 1101 and 1105. The final state duration count n is set to 0 and the observation time index t is set to 1 in steps 1110 and 1115. An observation vector signal representative of an LPC vector feature signal is produced by randomly selecting an observation O according to the probability function $b_i(O)$ of the multivariate Markov model $\lambda^r$ as per step 1120. A transition to the next state j is made based on those transitions permitted by the model and the probability of each permitted transition (step 1125). For the left-to-right Markov models, only transitions to the current and next two states are allowable. The current state i becomes the destination state j of step 1125 in step 1130. As long as current state i is not the final state N (step 1135), the time index is incremented (step 1142) and feature signal observation symbol generating step 1120 is reentered. When the final state N is reached (step 1135), state duration index n is incremented (step 1140) and observation symbol generation is iterated in the loop, including steps 1120, 1125, 1130, 1135, 1140, 1142, and 1145 until the state duration count reaches a predetermined value (step 1145). At that time, the observation sequence count is increased (step 1150), and the next observation sequence is formed via step 1105. After the K sequences have been generated and stored, the observation symbol sequence formation shown in FIG. 11 is performed for Markov model $\lambda^r$ by changing the a and b model parameter signals in the steps of FIG. 11. Step 610 of FIG. 6 is then entered from step 1155 of FIG. 11.

At this point in the template generation process, a set of observation sequences based on model $\lambda^r$ and a set of observation sequences based on model $\lambda^r$ have been generated and stored. Since the succession of Markov models produced in accordance with the invention are convergent, a comparison of the current and immediately succeeding models shows whether an improvement in the modeling has occurred. When the improvement is below a predetermined threshold $\epsilon$, the immediately succeeding model $\lambda^r$ is accepted as the template for the selected speech pattern.

In step 610, a signal $L(O|\lambda^r)$ representative of the probability that an observation sequence has been generated by Markov model $\lambda^r$ is produced in accordance with equation (1). A signal $L(O|\lambda^r)$ is also formed, and the similarity between the model probabilities is evaluated through a distance measure of equation (14) as per step 615. If the distance measure $d(\lambda^r, \lambda^r)$ is not lower than a threshold $\epsilon$, model $\lambda^r$ is not considered a sufficiently accurate approximation for use as a reference pattern template. In this event, output model $\lambda^r$ becomes current input model $\lambda^r$, and control is transferred to step 420 of FIG. 4 for the formation of a new successive output model $\lambda^r$. When the similarity between models $\lambda^r$ and $\lambda^r$ in step 620 is better than threshold $\epsilon$, the output Markov model signals $\lambda^r$ are reestimated in step 625 to obtain the best Markov model approximation.

Figure 12:
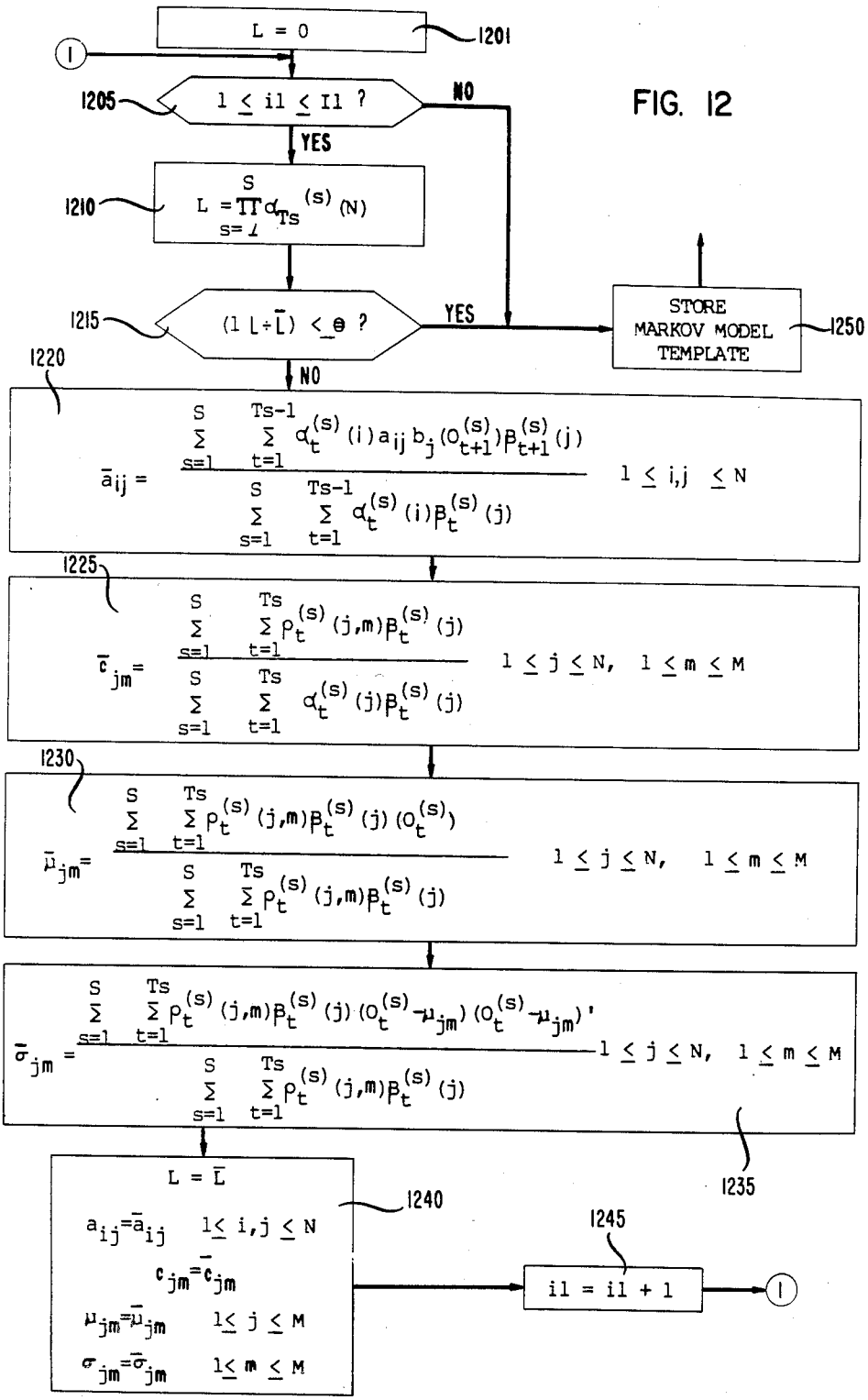
FIG. 12 is a flow chart detailing the Markov model reestimation step of FIG. 6.

The reestimation method is illustrated in the flow chart of FIG. 12, and the instructions in store 720 to perform the functions in FIG. 12 are shown in Appendix E. Referring to FIG. 12, the likelihood signal L is initially set to 0 in step 1201, and the reestimation iteration index i1 is reset to 1 in step 1203. The likelihood signal of the current iteration is generated as per step 1210 using the relationship of equation (15) for $\alpha_{T_s}$ given in equation (16) after index i1 is compared to iteration limit I1 (step 1205). The likelihood signal of the preceding iteration L is then compared to the current iteration likelihood signal $\overline{L}$ as per step 1215. As long as the relationship of step 1215 is not satisfied, the Markov model parameter signals are modified in steps 1220, 1225, 1230, and 1235 in accordance with equations (18), (19), (20) and (21) so that more accurate Markov model parameters may be formed.

In step 1220, the numerator represents the expected number of transitions from state i to state j for the observation sequence O, and the denominator corresponds to the expected number of transitions out of state i. The ratio is an estimate of the transition probability $\overline{a}_{ij}$ as per equation (18). Step 1225 provides an estimate of the mth mixture coefficient, $c_{jm}$, of the jth state according to equation (19) which is obtained from the ratio of the expected number of observations from the mth term of the mixture for the jth state and the expected number of observations in the jth state.

Step 1230 corresponds to mean value $\mu_{jm}$ of the observations of equation (20) and is formed from the ratio of the expected value of feature observations over the entire observation sequence O to the likelihood of a feature observation coming from the mth mixture term in state j. In like manner, the variance $\sigma_{jm}$ of the observations in step 1235 corresponds to equation (21) and is formed by taking the ratio of the expected value of the variance of feature observations to the likelihood that a feature observation comes from the mth mixture term in state j.

Subsequent to the modifications of the Markov model parameter signals of the current iteration in steps 1220 through 1235, the model parameter signals of the preceding iteration are replaced by those obtained in the current iteration (step 1240). The iteration index i1 is then incremented in step 1245, and decision step 1205 is reentered. Since the Markov model parameter signals of succeeding iterations are convergent, the ratio of succeeding likelihood signals L and L̄ approaches unity as the iteration index count increases.

When the condition of step 1215 is satisfied or I1 iterations have been completed, the Markov model reestimation for the current digit template is completed, and the model signals are stored in template store 728 of FIG. 7 (step 1250). After the Markov model signals for the rth template have been reestimated as per the steps of FIG. 12, step 630 is then entered from step 1250, and the digit index r is incremented therein. The incremented index is tested as the last speech pattern template in step 635. The Markov model template formation for the successive speech patterns is continued as per the flow charts of FIGS. 4, 5, and 6 until the last speech pattern template I is placed in store 728. The Markov model templates for the speech pattern vocabulary may then be transferred to utilization device 740 via bus 735 and interface 730.

Figure 13:
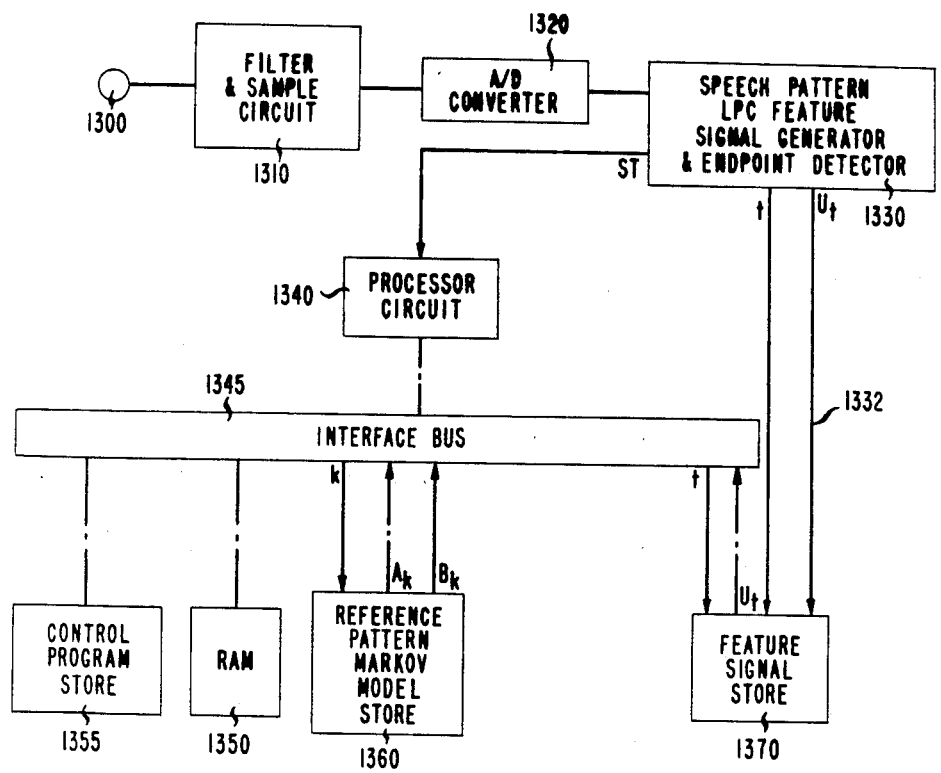
FIG. 13 depicts a block diagram of a speech recognition circuit utilizing the Markov model reference templates of the invention.
Figure 14:
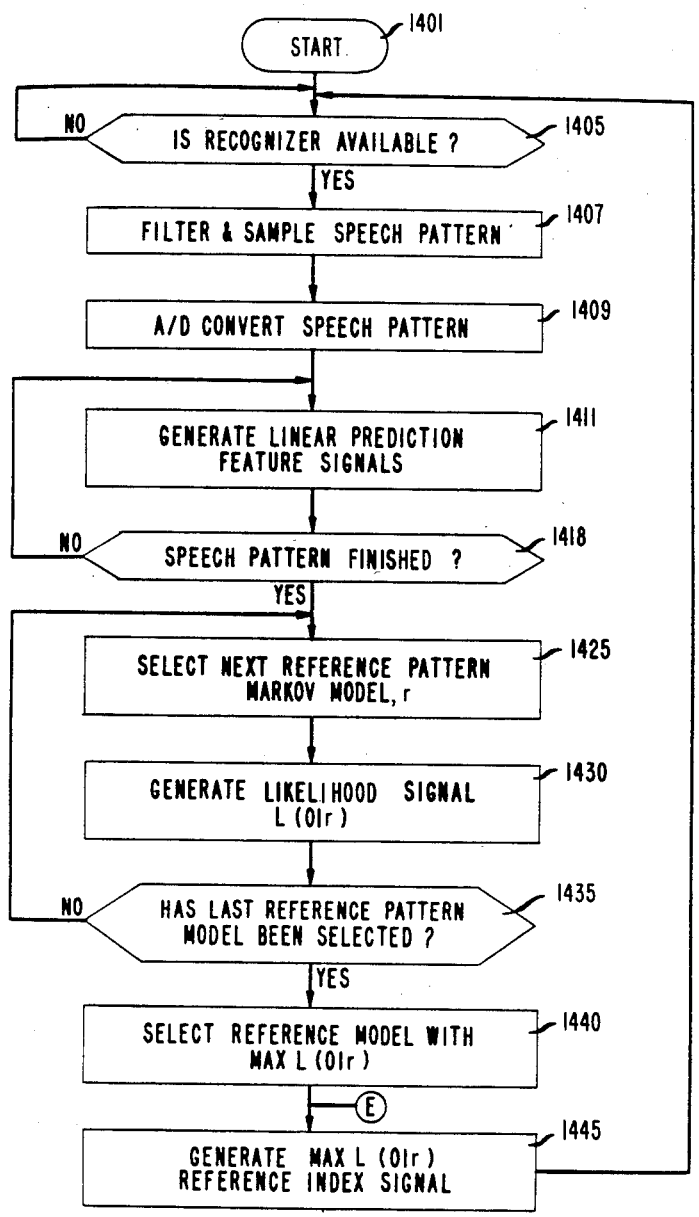
FIG. 14 is a flow chart illustrating the operation of the recognizer of FIG. 13.

A set of Markov model signals is generated for each reference pattern to be recognized and stored in a reference pattern Markov model store of a speech recognizer such as shown in FIG. 13. The reference patterns may, for example, be the spoken digits 0 through 9. When the recognizer receives a speech pattern input at microphone 1310, it operates in accordance with the flow chart of FIG. 14 to provide a signal r* that identifies the spoken digit of the input speech pattern. In FIG. 13, the reference pattern Markov model signal sets are permanently stored in read-only memory 1360, and the operation of the recognizer set forth in FIG. 14 is controlled by the permanently stored instructions in control program store 1355. Feature signal generator 1330 may comprise a microprocessor such as type MC68000 manufactured by Motorola Inc., having permanently stored instructions to control feature signal generation and endpoint detection well known in the art. Processor 1340, bus 1345, control memory 1350 and RAM 1355 may be the type OB68K1A MC68000/MULTIBUS single board computer manufactured by Omnibyte Corporation, West Chicago, Ill. A Q bus arrangement could also be used.

Referring to FIGS. 13 and 14, step 1407 is entered from step 1405 when the recognizer is available to process a new speech pattern input at transducer 1300. The speech pattern is converted into a sequence of digital codes representative of the successive speech samples of the pattern in filter and sample circuit 1310 and analog-to-digital converter 1320 as is well known in the art as per steps 1407 and 1409. Responsive to the digital codes from converter 1320, a sequence of speech pattern feature signals is generated in LPC feature signal generator 1130 and endpoint detector 1130 (step 1411) and transferred to feature signal store 1370.

When the end of the pattern is detected (step 1418), the Markov model signal set of the first stored reference pattern is selected (step 1425) in processor circuit 1340 in accordance with the programmed instructions of control program store 1355. The speech pattern feature signals from feature signal store 1370 are combined with the selected Markov model signal set from store 1360 in processor 1340 to form a signal representative of the likelihood that the speech pattern corresponds to the selected reference pattern (step 1430). The loop including steps 1425, 1430 and 1435 is iterated through all reference pattern Markov model signal sets so that a likelihood signal is stored for each reference pattern. The reference pattern having the maximum likelihood signal is selected in step 1440, and the reference pattern index signal identifying the input speech pattern is produced by processor 1340 in step 1445. Control is then returned to step 1405 for recognition of subsequent speech patterns.

The invention has been shown and described with reference to a particular embodiment thereof. It is to be understood, however, that various modifications and changes in form and detail may be made by those skilled in the art without departing from the spirit and scope of the invention.

Appendix A

```
      C
      C  model generation
      C
  5       DIMENSION O(10,1000),PI(10,20),PIO(10,20),ITER(20)
          DIMENSION A(10,10,20),C(10,10,20),AV(10,10,10,20),
                    U(10,10,10,20)
          DIMENSION AO(10,10,20),CO(10,10,20),AVO(10,10,10,20),
                    UO(10,10,10,20)
 10       DIMENSION UET(10,10,10,20),UETO(10,10,10,20)
          INTEGER D
      C
      C  NNUMBER OF STATES
      C  MNUMBER OF MIXTURES
 15   C  DVECTOR DIMENSION
      C  EPSPERTURBING CONSTANT
      C  NRNUMBER OF WORDS IN VOCABULARY
      C  LMAXNUMBER OF DATA PATTERN SEQUENCES
      C  THETACONVERGENCE THRESHOLD
 20   C
          READ (3,*) N,M,D,EPS
              READ (3,*) NR,LMAX,THETA
      C
```

```
C backtracking
C
200 CALL BACKTR(N,M,D,NR,LMAX)
C
C initialize the model parameters
C
    CALL HMMINIT(NR,N,M,D)
C
C word loop
C
    DO 1000 IR=1,NR
C
C get the generated model
C
    CALL GETMOD(A(1,1,IR),C(1,1,IR),AV(1,1,1,IR),U(1,1,1,IR),
           N,M,D,EPS)
    IF(ITER(IR).EQ.1) GOTO 1000
C
C get data sequence
C
    CALL GETSEQ(O,D,LMAX,IR)
C
C save model for convergence check
C
    CALL MODCOPY(A(1,1,IR),C(1,1,IR),AV(1,1,1,IR),
           U(1,1,1,IR),N,M,D,
   1       AO(1,1,IR),CO(1,1,IR),AVO(1,1,1,IR),UO(1,1,1,IR))
C
C reestimation algorithm
C
    CALL REEST(N,M,D,LMAX,O,A(1,1,IR),C(1,1,IR),AV(1,1,1,IR),
   1       U(1,1,1,IR), P,THETA
C
C evaluate distance
C
    CALL HMMDC(PI(1,IR),A(1,1,IR),C(1,1,IR),AV(1,1,1,IR),
           U(1,1,1,IR),
   1       UET(1,1,1,IR),PIO(1,IR),AO(1,1,IR),CO(1,1,IR),
           AVO(1,1,1,IR),
   2       UO(1,1,1,IR),UETO(1,1,1,IR),N,M,D,NSEQ,LEN,DIST)
    IF(DIST.LT.0.0001) ITER(IR)=1
1000 CONTINUE
C
C final check
C
    DO 300 I=1,NR
300 IF(ITER(I).NE.1) GOTO 200
C
C put model parameters in store
C
    CALL PUTMOD(A,C,AV,U,N,M,D,NR)
    STOP
    END
C
C PERFORMING BACKTRACKING VIA VITERBI DECODING
C
    SUBROUTINE BACKTR(N,M,D,EPS,NR,LMAX)
C
        DIMENSION PI(10),A(10,10,20),C(5,10,20),
   1    AV(10,5,10,20),U(10,5,10,20),F(10,100),
   2    CS(10,20),FS(10,1000,10,20),QHAT(100)
C
C       READ IN MARKOV MODELS
```

```
      C
            DO 10 IR=1,NR
      10CALL GETMOD(A(1,1,IR),C(1,1,IR),AV(1,1,1,IR),U(1,1,1,IR),
           1  N,M,D,EPS)
      C
      C ERASE THE COUNT
      C
            CALL ZERO(CS,N*NR)
            IP=1
      C
      C MAIN LOOP
      C GET SEQUENCE F, TL ( =LT), AND WL ( =LW)
      C
      100CALL GETSEQ(F,D,LT,LW)
      C
      C       RUN VITERBI DECODING
      C
            CALL VITDEC(A(1,1,LW),C(1,1,LW),AV(1,1,1,LW),
           1   U(1,1,1,LW),F,PI,N,M,D,LT,PLOG,FS(1,1,1,LW),
                CS(1,LW),QHAT)
         IP=IP+1
         IF(IP.LT.LMAX) GOTO 100
      C
      C PUT THE BACKTRACKED SEQUENCE INTO STORE
      C
         CALL PUTSEQ(FS,CS,D)
             RETURN
             END
      C
      C initialization of Markov model via a clustering algorithm
      C
         SUBROUTINE HMMINIT(NR,NSTATE,NSIZE,IDIM)
      C...
         DIMENSION RA(500),RN(500),RC(500)
         DIMENSION ICONT(128),R(10,5000),DCONT(128)
      C
      C loop
      C
         EPN=0.01
         DO 5000 IR=1,NR
         DO 3000 ISTATE=1,NSTATE
      C
      C get data sequence
      C
         CALL GETSEQ1(R,IDIM,L,LDUM,ISTATE,IR)
         CALL CLUST(R,RA,RC,RN,NSIZE,L,IDIM,ICONT,EPN)
      C
      C write the mixture weight array
      C
         DO 180 I=1,NSIZE
      180DCONT(I)=FLOAT(ICONT(I))/ITOT
         CALL WRSEQ(1,DCONT,NSIZE,IR)
      C
      C now, write location vector and the covariance alternately
      C
         K=0
         DO 350 I=1,NSIZE
         CALL WRSEQ(1,RA(K+1),IDIM,IR)
         CALL WRSEQ(1,RC(K+1),IDIM,IR)
      350K=K+IDIM
      3000CONTINUE
      5000CONTINUE
      C
```

```
C   codebook written
C
C
    RETURN
    END
C
        SUBROUTINE HMMDC(U1,A1,C1,AV1,B1,BET1,U2,A2,C2,AV2,
     1      B2,BET2, N,M,MD,NSEQ,LEN,D)
C
        DIMENSION U1(10),A1(10,10),C1(10,10),AV1(10,10,10)
        DIMENSION B1(10,10,10,10),BET1(10,10,10)
        DIMENSION U2(10),A2(10,10),C2(10,10),AV2(10,10,10)
        DIMENSION B2(10,10,10,10),BET2(10,10,10)
        DIMENSION O(10,100),ALPH1(30),ALPH2(30)
C
        D=0.
        IER=0
    NX=10
    MX=10
    MDX=10
    LX=100
        ISEQ=1
C
C   initialize forward probabilities
C
500     DO 100 I=1,N1
100     ALPH1(I)=U1(I)
        DO 110 I=1,N2
110     ALPH2(I)=U2(I)
C
C   create LEN samples
C
        CALL GENSEQ(U1,A1,C1,AV1,B1,BET1,N1,M1,MD,NX,MX,MDX,
     1      O,LEN,LX,IER)
        IF(IER.GT.0) GOTO 400
C
C   evaluate probability for m1
C
        CALL EVA(A1,C1,AV1,B1,BET1,U1,O,ALPH1,N,M,MD,NX,MX,
     1      MDX,LEN,P1)
        IF(IER.GT.0) GOTO 400
C
C   evaluate probability for m2
C
        CALL EVA(A2,C2,AV2,B2,BET2,U2,O,ALPH2,N2,M2,MD,NX,
     1      MX,MDX,LEN,P2)
        IF(IER.GT.0) GOTO 400
C
C   accumulate likelihood
C
250     F1=ALOG(P1)
        F2=ALOG(P2)
C
C   compute the distance
C
        D=D+((F1-F2)/FLOAT(LEN))
        ISEQ=ISEQ+1
        IF(ISEQ.LE.NSEQ) GOTO 500
        D=D/FLOAT(NSEQ)
400     RETURN
        END
C
        SUBROUTINE EVA(A,C,AV,B,BETA,PI,O,ALPHA,N,M,MD,NX,
     1      MX,MDX,LEN,P)
C
```

```
      DIMENSION A(NX,NX),C(MX,NX),AV(MDX,MX,NX)
      DIMENSION B(MDX,MDX,MX,NX),BETA(MDX,MX,NX),PI(MX,NX)
      DIMENSION ALPHA(1),F(30),X(30),O(MDX,1)
C
      LT=1
C
C     evaluate F first
C
1000  DO 100 I=1,N
      F(I)=0.
C
C     calaulate the exponential term
C
      DO 200 K=1,M
      EXPX=0.
      DO 210 II=1,MD
      X(II)=0.
      DO 220 IJ=1,MD
220   X(II)=X(II)+B(II,IJ,K,I)*(O(IJ,LT)-AV(IJ,K,I))
210   EXPX=EXPX+(X(II)*X(II)/BETA(II,K,I))
      F(I)=F(I)+C(K,I)*PI(K,I)*EXP(-0.5*EXPX)
200   CONTINUE
100   CONTINUE
      DO 300 I=1,N
      X(I)=0.
      DO 400 J=1,N
400   X(I)=X(I)+ALPHA(J)*A(J,I)
300   X(I)=X(I)*F(I)
C
C     compute probability
C
      P=0.
      DO 500 I=1,N
      P=P+X(I)
500   ALPHA(I)=X(I)
      LT=LT+1
      IF(LT.LE.LEN) GOTO 1000
C
      RETURN
      END
```

Appendix B

```
C
   SUBROUTINE VITDEC(A,C,AV,U,O,PI,N,M,D,T,P,FS,CS,QHAT)
   DIMENSION ALPHA(100,10),A(10,10),C(5,10),FS(1),CS(1)
  1AV(10,5,10),U(10,5,10),PI(10),O(10,100),PAC(100),
         PLOC(100)
   INTEGER BETA(100,10),QHAT(1),T,TAU,D
C
   TAU=1
   DO 1 I=1,N
   CALL PROBV(O(1,1),C(1,I),AV(1,1,I),U(1,1,I),PLOG,D,M)
   ALPHA(1,I)=PI(I)+PLOG
 1 CONTINUE
   DO 3 TAU=2,T
   DO 3 J=1,N
   BIG=-1.0E75
   ISTAR=1
   JM=J-2
   IF(JM.LT.1) JM=1
   DO 2 I=JM,J
```

```
      ATP1=ALPHA(TAU-1,I)+A(I,J)
      IF(ATP1 .LE. BIG) GO TO 2
      BIG=ATP1
      ISTAR=I
    2 CONTINUE
      CALL PROBV(O(1,TAU),C(1,J),AV(1,1,J),U(1,1,J),PLOG,D,M)
      BIG=BIG+PLOG
      ALPHA(TAU,J)=BIG
      CS(I)=CS(I)+1
      CALL COPY(O(1,TAU),FS(1),D)
    3 BETA(TAU,J)=ISTAR
      BIG=ALPHA(T,N)
      QHAT(T)=N
      P=ALPHA(T,QHAT(T))
      PAC(T)=P
      DO 5 TAU=T,2,-1
      QHAT(TAU-1)=BETA(TAU,QHAT(TAU))
      PAC(TAU-1)=ALPHA(TAU-1,QHAT(TAU-1))
    5 CONTINUE
      PLOC(1)=PAC(1)
      DO 7 TAU=2,T
    7 PLOC(TAU)=PAC(TAU)-PAC(TAU-1)
      RETURN
      END
C...
      SUBROUTINE PROBV(O,C,AV,U,PSUM,D,M)
C...
      DIMENSION O(10),AV(10,5),U(10,5),C(5)
      INTEGER D
      PSUM=0.
      DO 50 J=1,M
      Z=0.
      DO 10 I=1,D
   10 Z=Z+(O(I)-AV(I,J))*(O(I)-AV(I,J))/U(I,J)
      PLOG=-Z/2.+C(J)
      IF(M.EQ.1) RETURN
      PLIN=EXP(PLOG)
   50 PSUM=PSUM+PLIN
      PSUM=ALOG(PSUM)
      RETURN
      END
```

Appendix C

```
C...
      SUBROUTINE CLUST(R,RN,RA,RC,NSIZE,L,IDIM,ICONT,EPS)
C...
      DIMENSION RA(1),RN(1),RC(1)
      DIMENSION ICONT(1),R(10,5000),DCONT(1)
C...
      DOLD=1.E10
C...
C...read in initial RA array
C...
      CALL GETSEQ(RA,IDIM,NSIZE,LDUM)
C...
C...clear RN, RC accumulator, cell count array
C...
 1000 CALL ZERO(RN,NSIZE*IDIM)
      CALL ZERO(RC,NSIZE*IDIM)
      CALL IZERO(ICONT,NSIZE)
      DTOT=0.
      ITOT=0
```

```
      c...
      c...grand loop
      c...
      DO 1550 JKL=1,L
      c...
      c...search for the best
      c...
      CALL KFULL(R(1,JKL),RA,NSIZE,IDIM,DMIN,IMIN)
      MOFF=IDIM*(IMIN-1)
      DO 200 I=1,IDIM
      IX=MOFF+I
      RC(IX)=RC(IX)+R(I,JKL)*R(I,JKL)
 200  RN(IX)=RN(IX)+R(I,JKL)
      ICONT(IMIN)=ICONT(IMIN)+1
      DTOT=DTOT+DMIN
1550  ITOT=ITOT+1
1500  CONTINUE
      c...
      c...update mean vector and covarinace matrix
      c...
      CALL KCENTR(RN,RA,RC,ICONT,NSIZE,IDIM)
      DAVE=DTOT/ITOT
      RED=ABS(DOLD-DAVE)/DOLD
      DOLD=DAVE
      IF(RED.GT.EPSI) GOTO 1000
      c...
      RETURN
      END
      c...
      SUBROUTINE KFULL(R,RA,NSIZE,MDIM,DMIN,IMIN)
      c...
      DIMENSION R(1),RA(1)
      INTEGER*4 KK
      c...
      I=0
      DMIN=10.E50
      KK=1
      c...
      c...loop begins.
      c...
 500  I=I+1
      L=1
      D=0.
      c...
      c...compute distortion for Ith codeword
      c...
      DO 100 J=1,MDIM
      DR=R(L)-RA(KK)
      D=D+DR*DR
      L=L+1
 100  KK=KK+1
      c...
      c...is d less than dmin?
      c...
      IF(D.GT.DMIN) GOTO 200
      c...
      c...update minimum distortion registors
      c...
      DMIN=D
      IMIN=I
      c...
      c...end of the codebook?
      c...
 200  IF(I.LT.NSIZE) GOTO 500
```

```
c...
c...average dmin
c...
      RETURN
      END
c...
      SUBROUTINE KCENTR(RN,RA,RC,ICONT,NSIZE,MA)
c...
      DIMENSION RN(1),RA(1),RC(1),ICONT(1)
      INTEGER*4 K
c...
      K=1
c...
c...loop
c...
      DO 100 I=1,NSIZE
      X=ICONT(I)
      IF(X.LE.0.) X=1.
      DO 200 J=1,MA
      RA(K)=RN(K)/X
      RC(K)=(RC(K)/X)-RA(K)*RA(K)
200   K=K+1
100   CONTINUE
      RETURN
      END
```

Appendix D

```
c...
            DIMENSION U(10),A(10,10),C(10,10),B(10,10,10,10)
            DIMENSION AV(10,10,10),BETA(10,10,10),O(10,1000,100)
c...
      NX=10
      MX=10
      MDX=10
      LX=1000
      IUNIT=3
      READ(IUNIT,*) N,M,MD,NSEQ
C...
C...READ IN MODEL PARAMETERS
C...
      READMOD(IUNIT,U,A,C,AV,B,BETA,N,M,MD,NX,MX,MDX)
C...
C...SEQUENCE LOOP
C...
      ISEQ=1
100       CALL GENSEQ(U,A,C,AV,B,BETA,N,M,MD,NX,MX,MDX
             O(1,1,ISEQ),LEN,LX,IER)
      IF(IER.GT.0) GOTO 100
      ISEQ=ISEQ+1
      IF(ISEQ.LT.NSEQ) GOTO 100
      STOP
      END
C...
            SUBROUTINE GENSEQ(U,A,C,AV,B,BETA,N,M,MD,NX,MX,MDX,
              O,LEN,LX,IERR)
c...
            DIMENSION U(NX),A(NX,NX),C(MX,NX),B(MDX,MDX,MX,NX)
            DIMENSION AV(MDX,MX,NX),BETA(MDX,MX,NX),O(MDX,LX)
c...
            IER=0
```

```
            ILAST=0
            X=0.5*(XFLD(0)+1.0)
            Y=0.
            DO 100 I=1,N
            Y=Y+U(I)
            IF(Y.GT.X) GOTO 200
    100     CONTINUE
            IER=1
            GOTO 1000
    200     ISTATE=I
            IF(I.EQ.N) ILAST=ILAST+1
    c...
    c...    start time loop
    c...
    250     IT=1
    c...
    c...    get the next state number
    c...
    500     X=0.5*(XFLD(0)+1.0)
            Y=0.
            DO 300 I=1,N
            Y=Y+A(ISTATE,I)
            IF(Y.GT.X) GOTO 400
    300     CONTINUE
            IER=1
            GOTO 1000
    c...
    c...    get the mixture branch label
    c...
    400     X=0.5*(XFLD(0)+1.0)
            Y=0.
            DO 600 J=1,M
            Y=Y+C(J,I)
            IF(Y.GT.X) GOTO 700
    600     CONTINUE
            IER=1
            GOTO 1000
    c...
    c...    register state number
    c...
    700     ISTATE=I
            IF(I.EQ.N) ILAST=ILAST+1
    c...
    c...    generate the normal vector
    c...
            CALL RVNORM(AV(1,J,I),B(1,1,J,I),BETA(1,J,I),MDX,MD,
              O(1,IT),IER)
            IF(IER.GT.0) GOTO 1000
    c...
    c...    increment time
    c...
            IT=IT+1
            IF(IT.LE.LX.AND.ILAST.LT.5) GOTO 500
            LEN=IT-1
    1000    RETURN
            END c...
            SUBROUTINE RVNORM(AV,B,BETA,MDX,MD,O,IER)
    c...
            DIMENSION AV(MDX),O(MDX),B(MDX,MDX),BETA(MDX),X(20)
    c...
            DO 400 I=1,MD
```

```
            SIG=SQRT(BETA(I))*0.5
            Y=0.
            DO 410 J=1,12
410         Y=Y+XFLD(0)
400         O(I)=Y*SIG
    C...
    C...vector transformation
    C...
            CALL LWRTRN(B,MDX,MD,X,O)
    C...
    C...    put back the O vector
    C...
            DO 600 I=1,MD
600         O(I)=X(I)
    C...
    C...    add the location vector
    C...
700         DO 800 I=1,MD
800         O(I)=O(I)+AV(I)
            RETURN
            END
```

Appendix E

```
C
C REEST--REESTIMATION PROCEDURE FOR CONTINUOUS OBSERVATION
          SEQUENCES
C
   SUBROUTINE REEST(N,M,D,T,O,A,C,AV,U,P,THETA)
C
   INTEGER D,T,TAU
   DIMENSION O(10,100),A(10,10),C(5,10),AV(10,5,10),
  1U(10,10,5,10),B(100,10),DBDC(100,5,10),USAV(10,10,5,10),
  2ALPHA(100,10),BETA(100,10),RHO(100,5,10),SAB(10),
  3SRB(5,10),SRBO(10,5,10),SRBOM(10,10,5,10),
  4DETU(5,10),SGT(10,10),SABCOR(10)
C
   PBAR=E-50
1000 CONTINUE
C
C EVALUATE PDF FOR EACH OBSERVATION FOR EACH SEQUENCE AND
          FOR EACH STATE
C
   DO 22 J=1,N
   DO 20 K=1,M
   DO 20 TAU=1,T
20 DBDC(TAU,K,J)=DDGPDF(O(1,TAU),AV(1,K,J),U(1,1,K,J),
           DETU(K,J),D)
   DO 22 TAU=1,T
   SUM=0.0
   DO 21 K=1,M
21 SUM=SUM+C(K,J)*DBDC(TAU,K,J)
22 B(TAU,J)=SUM
C
C INITIALIZE ALPHAS
C
   DO 2 I=1,N
2  ALPHA(1,I)=0.0
   ALPHA(1,1)=B(1,1)
   DO 5 TAU=2,T
   DO 5 J=1,N
   SUM=0.0
   DO 4 I=1,N
```

```
      4 SUM=SUM+ALPHA(TAU-1,I)*A(I,J)
        ALPHA(TAU,J)=SUM*B(TAU,J)
      5 CONTINUE
      C
      C CALCULATE P FOR THIS ITERATION
      C
        P=0.0
        DO 6 I=1,N
      6 P=P+ALPHA(T,I)
      C
      C INITIALIZE BETAS
      C
        DO 7 I=1,N
        BETA(T,I)=0.
        IF(I.EQ.N) BETA(T,I)=1.0
      7 CONTINUE
      C
      C CALCULATE BETA FOR EACH STATE AND OBSERVATION
      C
        DO 9 TAU=T-1,1,-1
        DO 9 I=1,N
        SUM=0.0
        DO 8 J=1,N
      8 SUM=SUM+A(I,J)*B(TAU+1,J)*BETA(TAU+1,J)
      9 BETA(TAU,I)=SUM
      C
      C CALCULATE RHO, SAB,SRB,SRBO, SRBOM ARRAYS FOR REESTIMATION
      C
        DO 10 J=2,N
        DO 10 K=1,M
     10 RHO(1,K,J)=0.
        DO 12 TAU=2,T
        DO 12 J=1,N
        DO 12 K=1,M
        SUM=0.0
        DO 11 I=1,N
     11 SUM=SUM+ALPHA(TAU-1,I)*A(I,J)*C(K,J)*DBDC(TAU,K,J)
     12 RHO(TAU,K,J)=SUM
        DO 13 I=1,N
        DO 13 TAU=1,T
     13 SAB(I)=SAB(I)+ALPHA(TAU,I)*BETA(TAU,I)
        DO 14 K=1,M
        DO 14 J=1,N
        DO 14 TAU=1,T
        RBD=RHO(TAU,K,J)*BETA(TAU,J)
        SRB(K,J)=SRB(K,J)+RBD
        DO 14 R=1,D
        SRBO(R,K,J)=SRBO(R,K,J)+RBD*O(R,TAU)
        DO 14 S=1,R
     14 SRBOM(S,R,K,J)=SRBOM(S,R,K,J)+RBD*(O(R,TAU)-AV(R,K,J))
               *(O(S,TAU)
          1-AV(S,K,J))
        DO 15 I=1,N
        SABCOR(I)=SABCOR(I)+ALPHA(T,I)*BETA(T,I)
        DO 15 J=1,N
        DO 15 TAU=2,T
     15 SGT(I,J)=SGT(I,J)+ALPHA(TAU-1,I)*A(I,J)*B(TAU,J)*BETA(TAU,J)
      C
      C REESTIMATE HMM PARAMETERS A,C,AV,U
      C
        DO 17 J=1,N
        DO 16 I=1,N
     16 A(I,J)=SGT(I,J)/(SAB(I)-SABCOR(I))
        DO 17 K=1,M
```

```
       C(K,J)=SRB(K,J)/SAB(J)
       DO 17 R=1,D
       AV(R,K,J)=SRBO(R,K,J)/SRB(K,J)
       U(R,R,K,J)=SRBOM(R,R,K,J)/SRB(K,J)
       IF(U(R,R,K,J).LT.UMIN) U(R,R,K,J)=UMIN
       USAV(R,R,K,J)=U(R,R,K,J)
   17CONTINUE
   18CONTINUE
   C
   C CONVERGENCE CHECK
   C
       IF(ABS(1.0-P/PBAR) .LT. THETA) GO TO 19
       PBAR=P
       GOTO 1000
   C
   C CONVERGENCE OBTAINED
   C
   19RETURN
       END
```

What is claimed is:

1. A method for analyzing speech comprising the steps of:
   generating speech pattern reference templates, including, for each such template, the steps of:
   a. analyzing at least one identified speech pattern to generate a frame sequence of acoustic feature signals representative thereof:
   b. generating a first set of signals representative of a state-transitional (Markov) model of said identified speech pattern;
   c. producing a speech pattern template responsive to the current state-transitional model and the said frame sequence of acoustic feature signals; and
   d. iterating steps b and c, including with respect to step b
   matching the continuously valued characteristics of the model to the observation measurements to produce a continuous-probability-density function; and with respect to step c grouping the feature signals of the speech patterns into related clusters corresponding to states of the previous state-transitional model, whereby with further grouping of the feature signals the continuous probability density function acquires components representing a mixture of different continuous probability density functions and the speech pattern template becomes the speech pattern reference template.

2. A method for analyzing speech according to claim 1 wherein said probability density signals comprise a signal representative of the mean value of sorted acoustic feature signals in each cluster of each state and a set of signals representative of covariance matrix values forming a mixture multivariate continuous probability density function for sorted acoustic feature signals in each cluster of each state.

3. A method for analyzing speech according to claim 2 wherein the iterating step includes
   forming a first signal corresponding to the likelihood of occurrence of the sequences of acoustic feature signals of the identified speech patterns from said previous state-transitional (Markov) model signal set;
   forming a second signal corresponding to the likelihood of occurrence of the sequences of acoustic features of the identified speech patterns from the current iteration state-transitional (Markov) model signal set; and
   generating a signal representative of the correspondence between said first and second likelihood signals.

4. The method for recognizing an unknown utterance as one of a plurality of stored reference patterns each comprising a set of signals representative of a Markov model of an identified speech pattern comprising the steps of:
   forming a time frame sequence of acoustic feature signals representative of the unknown utterance;
   generating a signal representative of the likelihood of the unknown speech pattern being each reference pattern jointly responsive to said sequence of acoustic feature signals of the speech pattern and the Markov model signals of each reference pattern; and
   identifying the unknown utterance as one of the reference patterns responsive to said probability representative signals;
   said Markov model signals being formed by the the method of claim 1.

5. The method for recognizing an unknown utterance according to claim 4 wherein the iterating step involved in forming the reference template further comprises:
   forming a first signal corresponding to the likelihood of occurrence of the sequences of acoustic feature signals of the identified speech patterns from the previous state-transitional (Markov) model signal set;
   forming a second signal corresponding to the likelihood of occurrence of the sequences of acoustic features of the identified speech pattern from the current iteration state-transitional (Markov) model signal set; and
   generating a signal representative of the correspondence between said first and second likelihood signals.

6. The method for recognizing an unknown utterance according to claim 5 wherein said step of forming the current iteration Markov model signal set involved in forming the reference template further comprises:
   sorting the acoustic feature signals of said speech patterns into states of the previous state-transitional (Markov) model
   sorting the acoustic feature signals of said speech patterns into states of the previous Markov model responsive to the previous Markov model signal set and the acoustic feature signal sequences of the identified speech patterns; and said current iteration Markov model forming step comprises forming signals representative of the probability density of occurrence of acoustic features responsive to the sorted acoustic feature signal sequences of the speech patterns and the previous Markov model signal set.

7. The method for recognizing an unknown utterance according to claim 6 wherein said probability density signals comprise a signal representative of the mean value of said sorted acoustic feature signals in each cluster of each state and a set of signals representative of covariance matrix values forming a mixture multivariate continuous probability density function for sorted acoustic feature signals in each cluster of each state.

8. A speech recognizer for recognizing an unknown utterance comprising:

means for storing a plurality of reference patterns each comprising a set of signals representative of a state-transitional (Markov model) of an identified speech pattern;

means for forming a time frame sequence of acoustic feature signals representative of the unknown utterance;

means jointly responsive to said sequence of acoustic feature signals of the utterance and the constrained Markov model signals of the reference patterns for generating a signal representative of the likelihood of the unknown speech pattern being each reference pattern; and identifying the unknown utterance as one of the reference patterns responsive to said likelihood representative signals;

wherein said templates stored in the means for storing speech pattern reference templates are generated by the method of claim 4;

the time frame sequence forming means being adapted to render said time frame sequence to be suitable for comparison with said templates.

* * * * *